United States Patent
Nishimura

(10) Patent No.: US 9,636,903 B2
(45) Date of Patent: May 2, 2017

(54) LAY-UP-POSITION CORRECTING METHOD FOR AUTOMATIC LAY-UP MACHINE

(71) Applicant: TSUDAKOMA KOGYO KABUSHIKI KAISHA, Kanazawa-shi, Ishikawa-ken (JP)

(72) Inventor: Isao Nishimura, Kanazawa (JP)

(73) Assignee: TSUDAKOMA KOGYO KABUSHIKI KAISHA, Kanazawa-shi (JP)

( * ) Notice: Subject to any disclaimer, the term of this patent is extended or adjusted under 35 U.S.C. 154(b) by 4 days.

(21) Appl. No.: 14/679,138

(22) Filed: Apr. 6, 2015

(65) Prior Publication Data
US 2015/0328876 A1    Nov. 19, 2015

(30) Foreign Application Priority Data

May 14, 2014  (JP) ................................ 2014-100718

(51) Int. Cl.
*B32B 41/00* (2006.01)
*B32B 38/18* (2006.01)
(Continued)

(52) U.S. Cl.
CPC ............ *B32B 41/00* (2013.01); *B29C 70/386* (2013.01); *B32B 37/0053* (2013.01);
(Continued)

(58) Field of Classification Search
CPC ......... B32B 41/00; B32B 37/20; B32B 38/10; B32B 37/0053; B32B 38/1808; B32B 2041/04; B32B 2309/72
(Continued)

(56) References Cited

U.S. PATENT DOCUMENTS 5,117,348 A      5/1992  Romero
5,314,563 A *    5/1994  Grimshaw ............ B29C 70/388
                                                         156/358

(Continued)

FOREIGN PATENT DOCUMENTS

EP    2 639 048 A1   9/2013
JP    06-055656 A    3/1994

OTHER PUBLICATIONS

European Search Report for the corresponding European Patent Application No. EP 15 16 3166 completed on Sep. 22, 2015.

*Primary Examiner* — Michael N Orlando
*Assistant Examiner* — Joshel Rivera
(74) *Attorney, Agent, or Firm* — Kenichiro Yoshida

(57) ABSTRACT

An automatic lay-up machine includes a head device and a support mechanism. The head device includes a sheet supplying unit that supplies a prepreg sheet including sheet-shaped prepreg and release paper bonded to a surface of the prepreg, a lay-up unit that lays up the prepreg on a receiving surface by pressing the prepreg sheet against the receiving surface, and a sheet take-up unit that takes up the release paper separated from the prepreg. The support mechanism supports the head device and includes a mechanism for moving the head device in a lay-up direction of the prepreg and a width direction of the prepreg sheet. The head device is moved in the width direction while a position of an edge of the prepreg sheet coincides with a lay-up position and an end portion of the prepreg sheet is pressed against the receiving surface.

3 Claims, 8 Drawing Sheets

(51) Int. Cl.
 B32B 38/10 (2006.01)
 B32B 37/00 (2006.01)
 B32B 37/20 (2006.01)
 B29C 70/38 (2006.01)
(52) U.S. Cl.
 CPC .............. *B32B 37/20* (2013.01); *B32B 38/10* (2013.01); *B32B 38/1808* (2013.01); *B32B 2041/04* (2013.01); *B32B 2309/72* (2013.01)
(58) Field of Classification Search
 USPC ......... 156/64, 350, 351, 360, 361, 363, 378, 156/379
 See application file for complete search history.

(56) References Cited

U.S. PATENT DOCUMENTS

| | | | |
|---|---|---|---|
| 2006/0118244 A1* | 6/2006 | Zaballos | B26D 1/085 156/510 |
| 2010/0006205 A1* | 1/2010 | McCowin | B29C 70/388 156/60 |

* cited by examiner

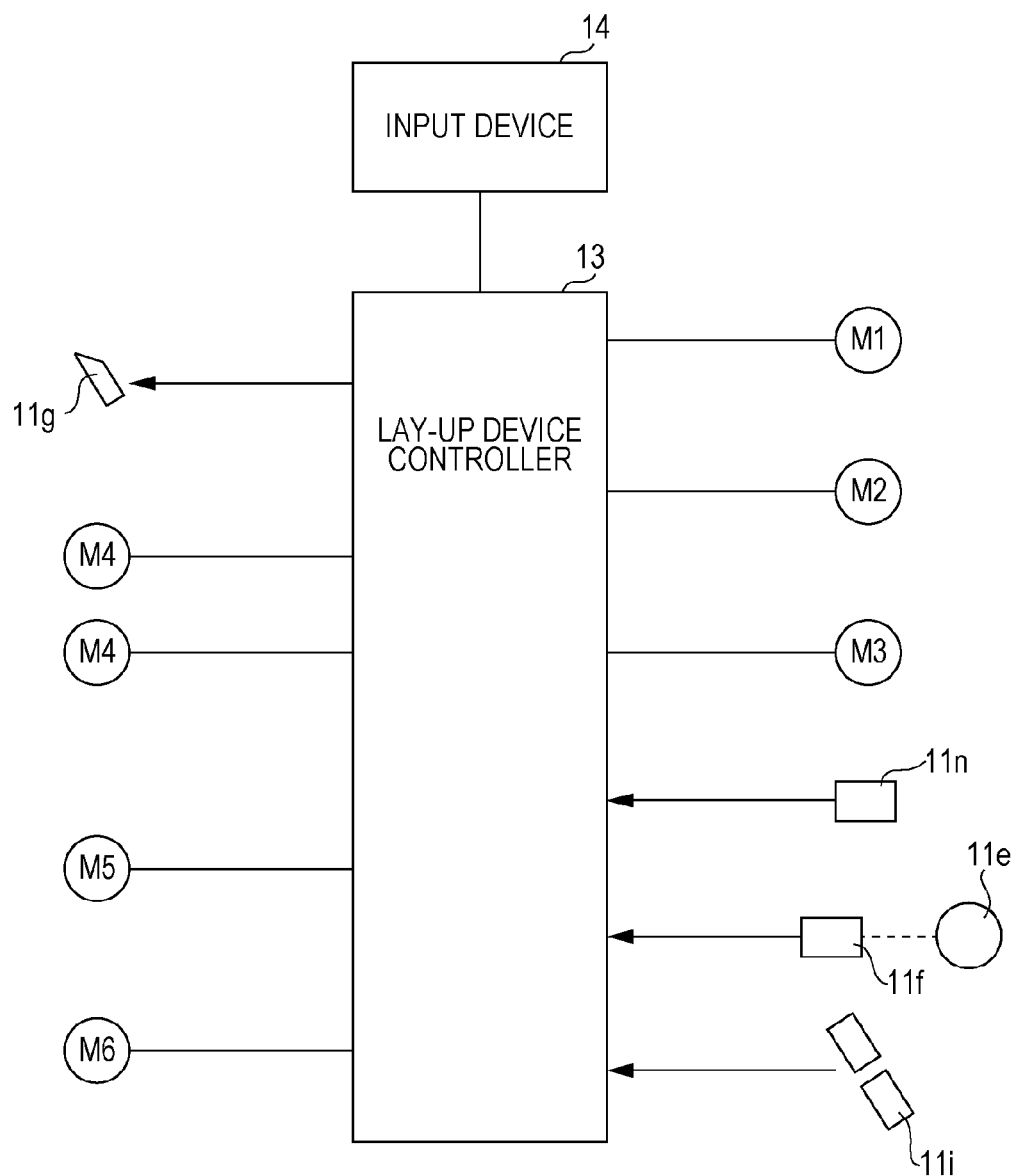

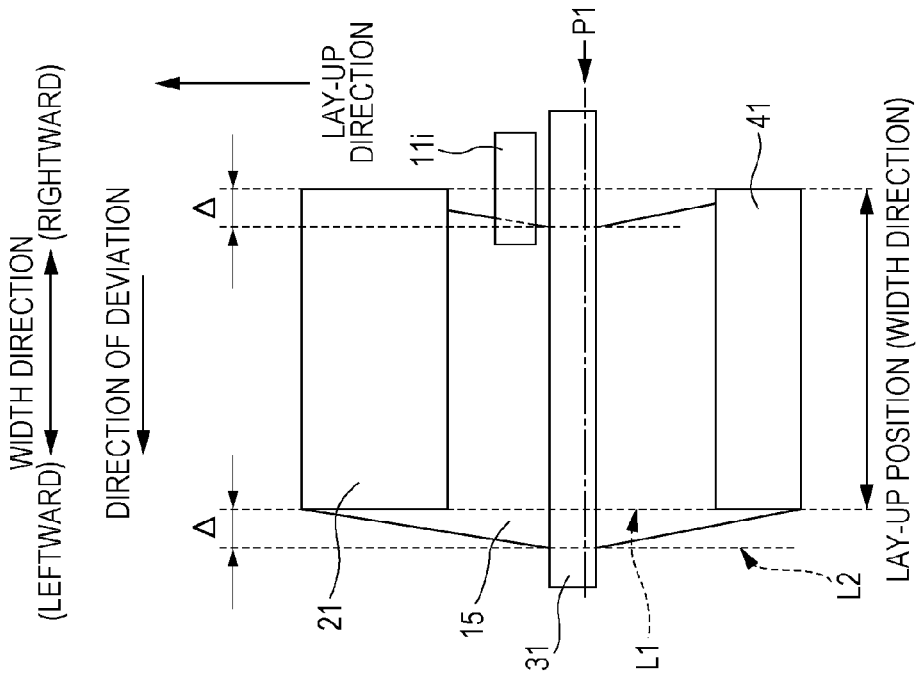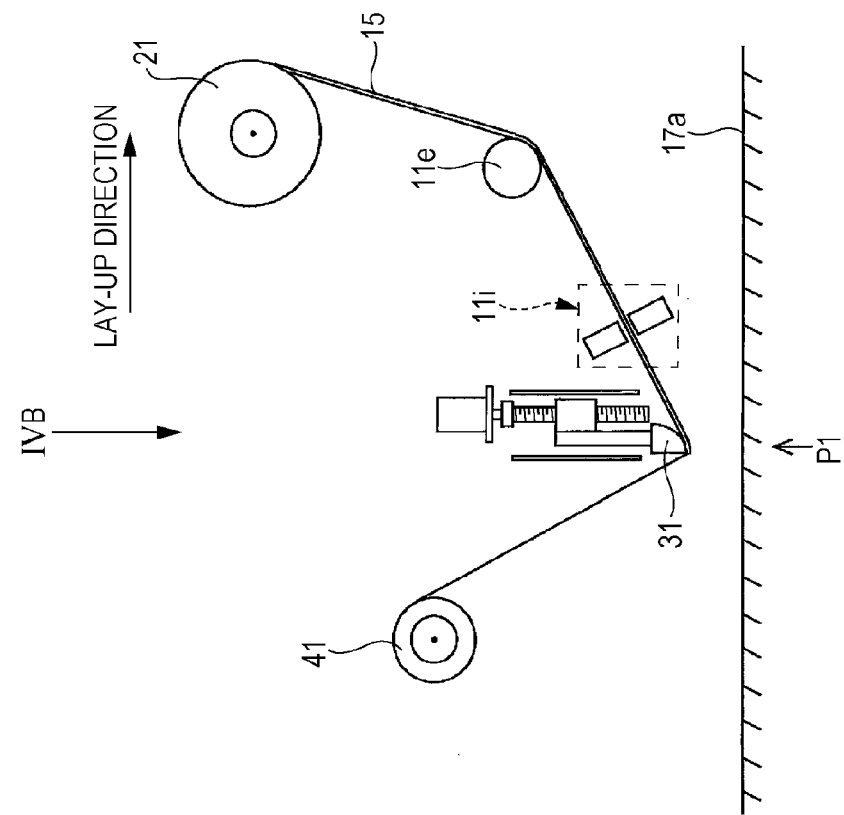

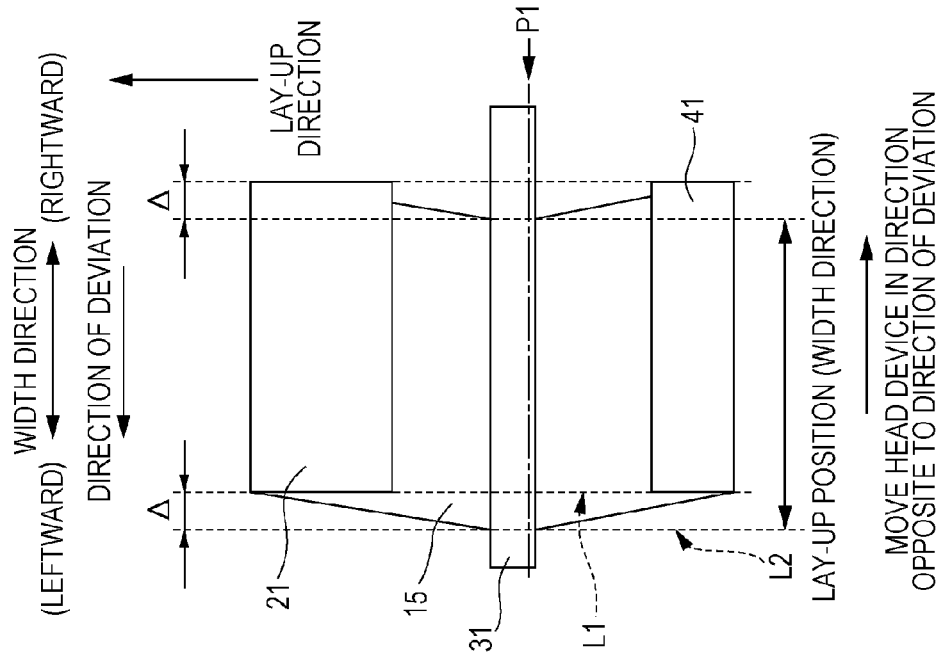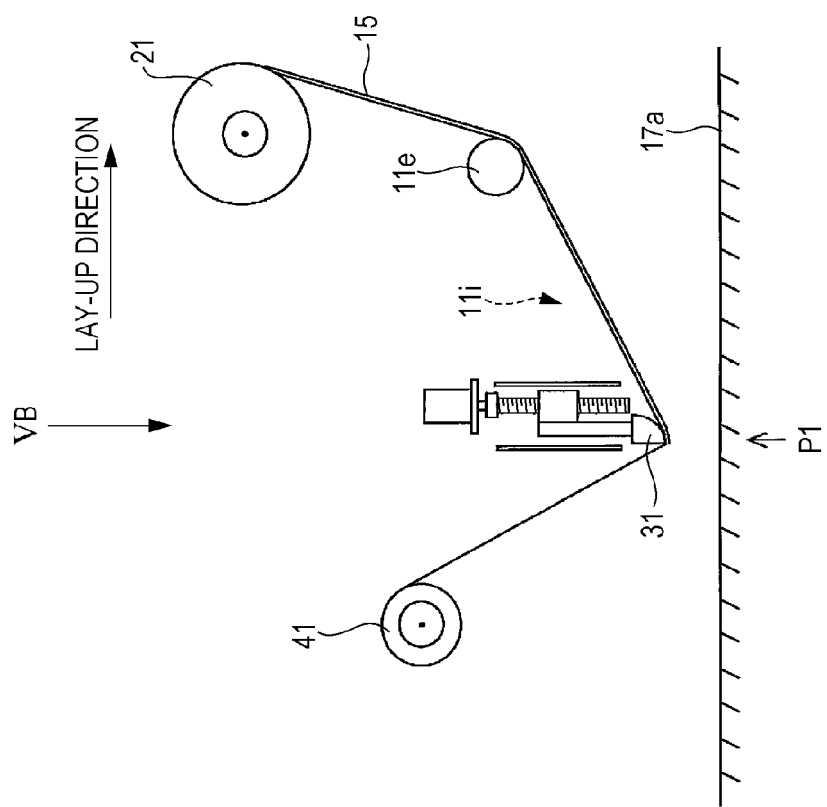

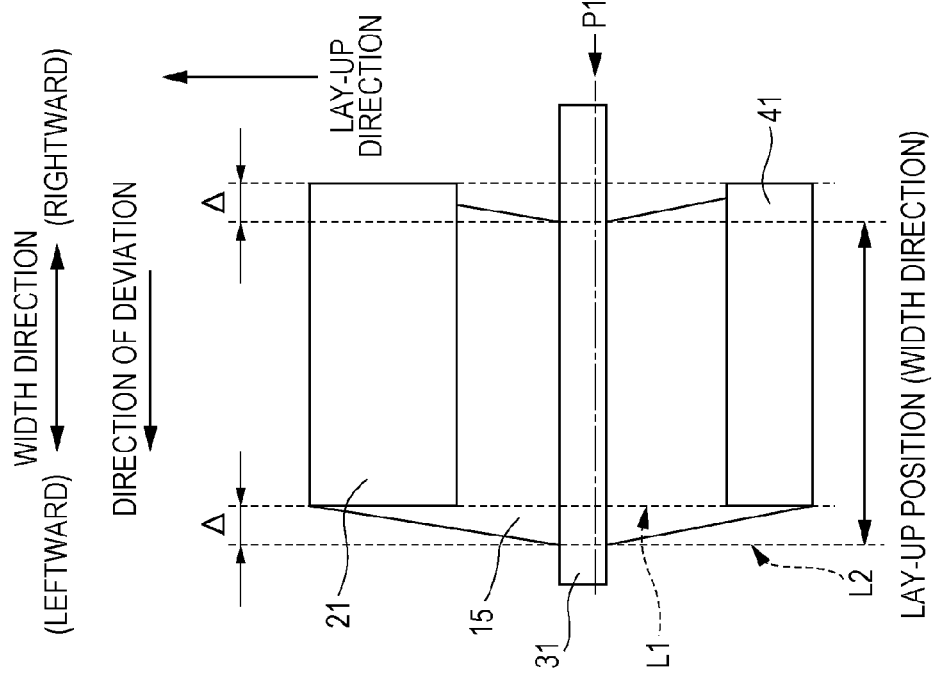
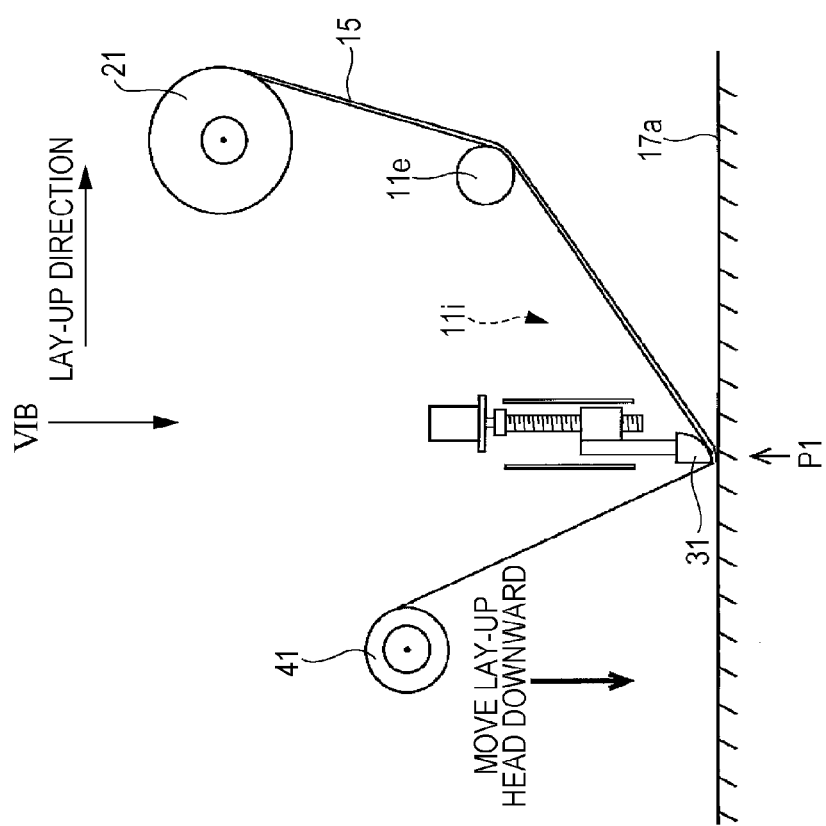

LAY-UP-POSITION CORRECTING METHOD FOR AUTOMATIC LAY-UP MACHINE

BACKGROUND OF THE INVENTION

1. Field of the Invention

The present invention relates to an automatic lay-up machine including a head device and a support mechanism. The head device includes a sheet supplying unit, a lay-up unit, and a sheet take-up unit. A raw-cloth roller having a long prepreg sheet wound therearound is mounted in the sheet supplying unit, and the sheet supplying unit supplies the prepreg sheet from the raw-cloth roller. The prepreg sheet includes sheet-shaped prepreg and release paper bonded to a surface of the prepreg. The lay-up unit lays up the prepreg on a receiving surface by pressing the prepreg sheet supplied by the sheet supplying unit against the receiving surface with a lay-up head. The sheet take-up unit takes up the release paper separated from the prepreg when the prepreg is laid up. The support mechanism supports the head device and includes a mechanism for moving the head device at least in a lay-up direction of the prepreg and a width direction of the prepreg sheet.

2. Description of the Related Art

Composite materials are used in aircraft-related components, automobile-related components, and sports and recreational goods. The composite materials are manufactured by forming a prepreg laminate into a predetermined shape and then pressing and heating the prepreg laminate. The prepreg laminate is obtained by laying up prepreg in which reinforced fiber, such as carbon fiber or glass fiber, is impregnated with an epoxy resin or the like.

The prepreg is generally laid up manually or by an automatic lay-up machine. The automatic lay-up machine lays up the prepreg by pressing a prepreg sheet supplied from a raw-cloth roller against a receiving surface with a lay-up head. Examples of the types of automatic lay-up machines include a type in which the raw-cloth roller is fixed and a type in which the raw-cloth roller moves together with the lay-up head.

A prepreg lay-up machine disclosed in Japanese Unexamined Patent Application Publication No. 6-55656 is an example of an automatic lay-up machine of the type in which the raw-cloth roller moves together with the lay-up head.

This prepreg lay-up machine includes a device (head device) including a let-off unit (sheet supplying unit), a lay-up unit, and a take-up unit (sheet take-up unit). A raw-cloth roller having long prepreg tape (prepreg sheet) wound therearound is mounted in the let-off unit (sheet supplying unit), and the let-off unit (sheet supplying unit) supplies the prepreg sheet from the raw-cloth roller. The prepreg tape (prepreg sheet) includes sheet-shaped prepreg and separation paper (release paper) bonded to a surface of the prepreg. The lay-up unit lays up the prepreg on a receiving surface by pressing the prepreg sheet supplied by the let-off unit against the receiving surface with a lay-up roller (lay-up head). The take-up unit (sheet take-up unit) takes up the release paper separated from the prepreg when the prepreg is laid up. In addition to the head device, the prepreg lay-up machine also includes a support mechanism (not shown) that supports the head device and includes an apparatus body (mechanism) that moves the head device three dimensionally (for example, in the lay-up direction of the prepreg and the width direction of the prepreg sheet). This prepreg lay-up machine lays up the prepreg by placing the prepreg next to the previously deposited prepreg with a predetermined gap therebetween in the width direction thereof, and automatically stops laying up the prepreg when the gap exceeds a predetermined allowable value.

In the automatic lay-up machine of the type in which the raw-cloth roller moves together with the lay-up head, the raw-cloth roller is positioned with respect to the receiving surface in the width direction when a lay-up operation is started. The prepreg is laid up by moving the raw-cloth roller and the lay-up head in a direction in which the receiving surface extends and pressing the prepreg sheet against the receiving surface with the lay-up head. In the lay-up process, even when the raw-cloth roller is moved while the position of the raw-cloth roller coincides with position of the receiving surface in the width direction, the prepreg sheet pressed by the lay-up head may become displaced from the receiving surface in the width direction. Such a displacement may be the result of the following.

That is, the prepreg sheet wound around the raw-cloth roller includes portions in which the internal stress (residual stress) is not uniform in the width direction. This is because although the prepreg sheet is wound around the raw-cloth roller while a tension is applied thereto, the tension distribution in the width direction is not appropriately managed.

When the prepreg sheet is supplied from the raw-cloth roller in the lay-up process, the internal stress in the prepreg sheet is released. As a result, a deviating force is generated in the prepreg sheet (prepreg) in the width direction, and the above-described displacement occurs.

Since the raw-cloth roller and the lay-up head are arranged such that the positions thereof coincide with the position of the receiving surface in the width direction, the deviation of the prepreg sheet (prepreg) appears as a displacement of the prepreg sheet (prepreg) with respect to the lay-up head in the width direction. In other words, when the displacement occurs, the position of the prepreg sheet (prepreg) with respect to the lay-up head in the width direction is shifted in the width direction from that at the start of the lay-up operation.

The amount of deviation of the prepreg sheet (prepreg) due to the internal stress is small, so that the displacement of the prepreg with respect to the receiving surface in the width direction caused in a single lay-up operation does not affect the quality of the prepreg laminate obtained as a result of the lay-up operation. However, if the next and following lay-up operations are performed without correcting the above-described displacement of the prepreg sheet (prepreg) with respect to the lay-up head in the width direction, the displacement gradually increases.

When the prepreg is laid up on the receiving surface while being displaced in the width direction by a large amount, a prepreg laminate that can be formed into a desired shape cannot be obtained. Thus, the quality of the prepreg laminate is degraded.

In addition, in an automatic lay-up machine in which prepregs are arranged next to each other in the width direction as described in Japanese Unexamined Patent Application Publication No. 6-55656, constant gaps cannot be provided between the adjacent prepregs. As a result, a prepreg laminate having a desired strength cannot be obtained, and the quality of the prepreg laminate is degraded.

SUMMARY OF THE INVENTION

The present invention has been made in light of the above-described circumstances. An object of the present invention is to provide a method for preventing quality degradation of a prepreg laminate due to an increasing displacement of a prepreg sheet (prepreg) in an automatic lay-up machine which, as described above, includes a head device including a sheet supplying unit, a lay-up unit, and a sheet take-up unit, and a support mechanism. The quality degradation of the prepreg laminate is prevented by correcting a position of the prepreg sheet (prepreg) with respect to a lay-up head in a width direction and cancelling the displacement when a lay-up operation is started.

The present invention is applied to an automatic lay-up machine including a head device and a support mechanism. The head device includes a sheet supplying unit in which a raw-cloth roller having a long prepreg sheet wound therearound is mounted and that supplies the prepreg sheet from the raw-cloth roller, the prepreg sheet including sheet-shaped prepreg and release paper bonded to a surface of the prepreg; a lay-up unit that lays up the prepreg on a receiving surface by pressing the prepreg sheet supplied by the sheet supplying unit against the receiving surface with a lay-up head; and a sheet take-up unit that takes up the release paper separated from the prepreg when the prepreg is laid up. The support mechanism supports the head device and includes a mechanism for moving the head device at least in a lay-up direction of the prepreg and a width direction of the prepreg sheet.

The present invention is a lay-up-position correcting method for the automatic lay-up machine for achieving the above-described object. The lay-up-position correcting method corrects a lay-up position (position of the prepreg sheet in the width direction at a start of a lay-up operation). The lay-up-position correcting method includes a first step of establishing a state in which a position of the raw-cloth roller coincides with a lay-up position in the width direction by moving the head device to a starting point of the lay-up position while the head device is in a state in which an end portion of the prepreg sheet fed from the raw-cloth roller is below the lay-up head and in which a predetermined tension is applied to the prepreg sheet; a second step of determining a deviation between a position of an edge of the prepreg sheet and the lay-up position in the width direction; a third step of establishing a state in which the position of the edge of the prepreg sheet coincides with the lay-up position in the width direction by moving the head device by a movement amount corresponding to the deviation in a movement direction along the width direction for cancelling the deviation; a fourth step of establishing a state in which the end portion of the prepreg sheet is pressed against the receiving surface at the starting point of the lay-up position by moving the head device or the lay-up head downward; and a fifth step of reestablishing the state in which the position of the raw-cloth roller coincides with the lay-up position in the width direction by moving the head device in a direction along the width direction opposite to the movement direction in the third step by an amount equal to the movement amount in the third step.

In this specification, the "end portion of the prepreg sheet" is a leading end portion of the prepreg sheet in the longitudinal direction, and is a portion located below the lay-up head. More specifically, as described above, the prepreg sheet fed from the raw-cloth roller includes the sheet-shaped prepreg and the release paper bonded to the surface of the prepreg. Therefore, a portion that has been fed from the raw-cloth roller prior to the portion located below the lay-up head, where the prepreg and the release paper are separated from each other in the lay-up operation, does not form the prepreg sheet, and is therefore not referred to as the prepreg sheet.

In addition, in this specification, the "edge of the prepreg sheet" is an edge of the prepreg sheet in the width direction.

In addition, in this specification, to be precise, the "lay-up position" that is described in relation to the "position of the edge of the prepreg sheet" is a position of an end of the lay-up position in the width direction at a side corresponding to the side of the edge of the prepreg sheet that is to be compared. Therefore, the "deviation between a position of an edge of the prepreg sheet and the lay-up position (in the width direction)" determined in the second step is the deviation between the position of the edge of the prepreg sheet and the position of the end of the lay-up position in the width direction. In addition, the "state in which the position of the edge of the prepreg sheet coincides with the lay-up position in the width direction" in the third step is the state in which the position of the edge of the prepreg sheet coincides with the position of the end of the lay-up position in the width direction. Similar expressions in the following description also have this meaning.

The lay-up-position correcting method according to the present invention may further include a tension reducing step of reducing a tension of the prepreg sheet, the tension reducing step being performed between the fourth step and the fifth step; and a tension returning step of reestablishing the state in which the predetermined tension is applied to the prepreg sheet, the tension returning step being performed after the fifth step.

In the case where the lay-up-position correcting method according to the present invention further includes the tension reducing step and the tension returning step, the tension reducing step may be a step of rotating the raw-cloth roller in a direction for feeding the prepreg sheet, and the tension returning step may be a step of rotating the raw-cloth roller in a direction for rewinding the prepreg sheet.

According to the present invention, in a state in which the position of the raw-cloth roller coincides with the lay-up position in the width direction at the start of the lay-up operation, the deviation between the position of the edge of the prepreg sheet and the lay-up position in the width direction is determined (second step), and the head device is moved in the width direction on the basis of the deviation to establish the state in which the position of the edge of the prepreg sheet coincides with the lay-up position (third step). Then, the state in which the end portion of the prepreg sheet is pressed against the receiving surface by the lay-up head is established (fourth step), and the head device is moved in a direction opposite to that of the above-described movement by an amount equal to that of the above-described movement to reestablish the state in which the position of the raw-cloth roller coincides with the lay-up position in the width direction (fifth step). Accordingly, the displacement of the prepreg sheet (prepreg) with respect to the lay-up head in the width direction can be canceled at the start of the lay-up operation. Since the lay-up operation is stated while there is no displacement, even when the prepreg is displaced from the lay-up position in the width direction due to the internal stress of the prepreg during the lay-up operation, the amount of displacement is not greater than that generated in a single lay-up operation, and is prevented from being further increased. As a result, degradation of the quality of the prepreg laminate due to the above-described displacement can be suppressed.

After the step of positioning the edge of the prepreg sheet with respect to the lay-up position in the width direction and establishing the state in which the prepreg sheet is pressed against the receiving surface (fourth step), the tension reducing step of reducing the tension of the prepreg sheet may be performed before the step of positioning the raw-cloth roller and the lay-up head with respect to the lay-up position in the width direction (fifth step), so that the fifth step can be performed in the state in which the tension of the prepreg sheet is reduced. In this case, the force by which the end portion of the prepreg sheet and the lay-up head is pressed against each other (hereinafter referred to also as "pressing force") can be reduced. As a result, in the fifth step, the head device can be moved in the width direction without applying a large force. Accordingly, the head device can be easily positioned in the width direction in the fifth step.

In addition, when the step of reducing the tension of the prepreg sheet and the step of returning the tension are performed by rotating the raw-cloth roller so as to feed and rewind the prepreg sheet, it is not necessary to provide a dedicated mechanism or the like for enabling the automatic lay-up machine (head device) to perform the above-described steps. Therefore, the structure of the automatic lay-up machine (head device) can be prevented from becoming complex.

BRIEF DESCRIPTION OF THE DRAWINGS

FIG. 3 illustrates the control system of a lay-up device controller included in the automatic lay-up machine.

FIGS. 4A and 4B illustrate the automatic lay-up machine viewed in the width direction and from above (in the direction of arrow IVB in FIG. 4A), respectively, in a first step and a second step of a lay-up-position correcting method.

FIGS. 5A and 5B illustrate the automatic lay-up machine viewed in the width direction and from above (in the direction of arrow VB in FIG. 5A), respectively, in a third step of the lay-up-position correcting method.

FIGS. 6A and 6B illustrate the automatic lay-up machine viewed in the width direction and from above (in the direction of arrow VIB in FIG. 6A), respectively, in a fourth step of the lay-up-position correcting method.

DESCRIPTION OF THE PREFERRED EMBODIMENTS

Figure 1:
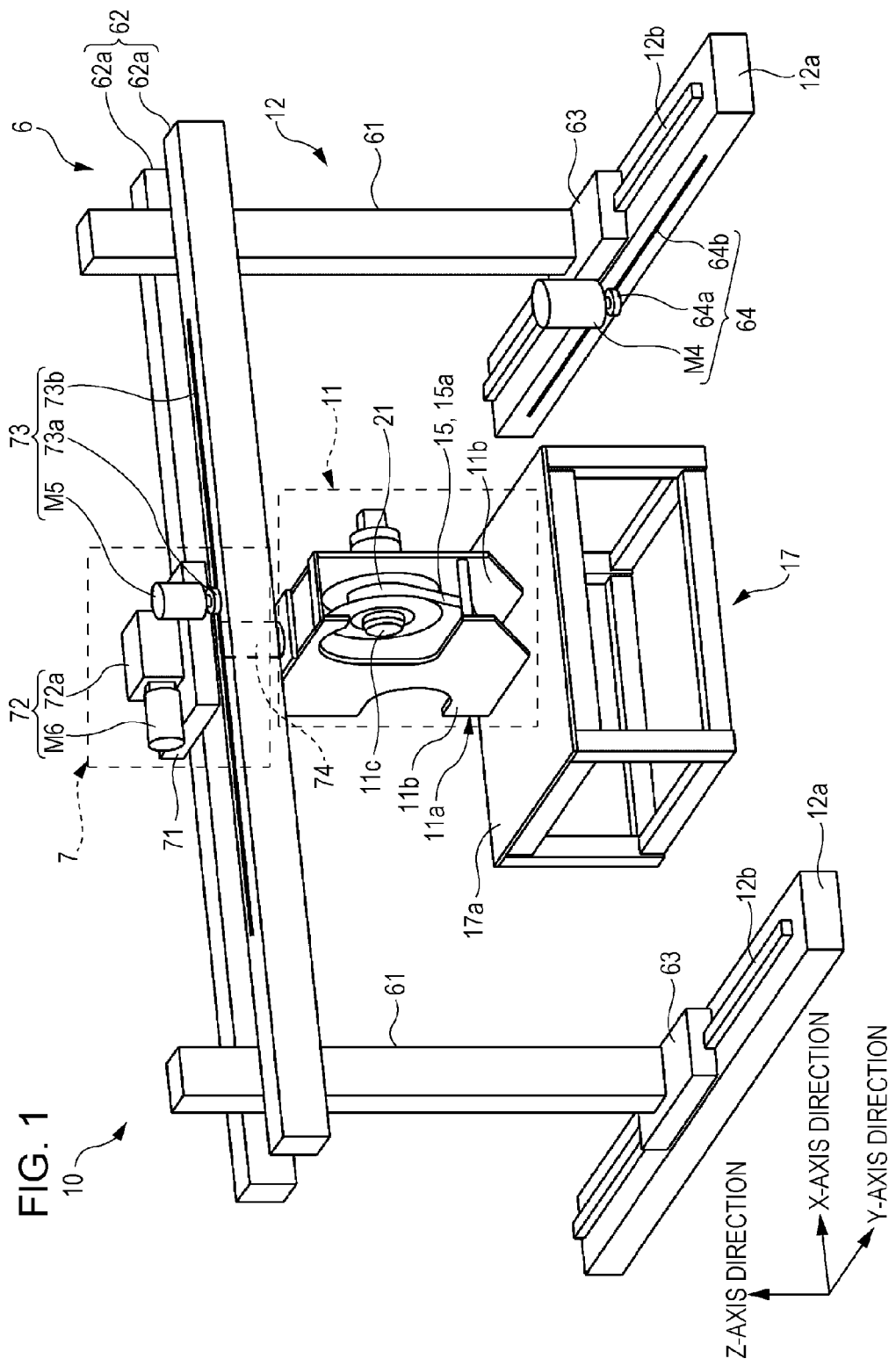
FIG. 1 is a perspective view of an automatic lay-up machine to which the present invention is applied.
Figure 2:
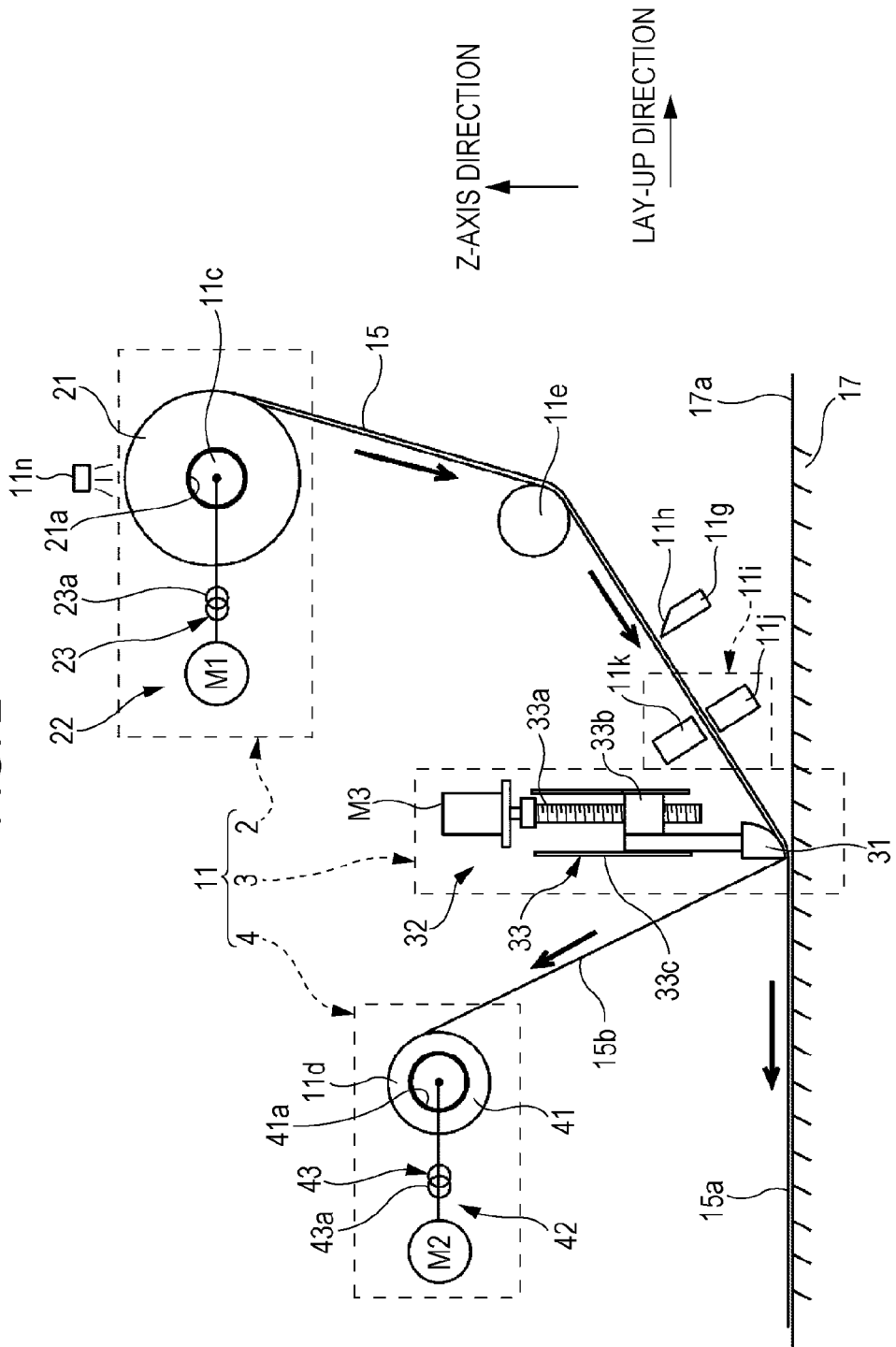
FIG. 2 illustrates a head device included in the automatic lay-up machine.

FIG. 1 illustrates an example of an automatic lay-up machine 10 to which the present invention is applied. The automatic lay-up machine 10 includes a head device 11 which supplies a prepreg sheet 15 and lays up prepreg 15a, and a support mechanism 12 including a mechanism for moving the head device 11. As illustrated in FIG. 2, the prepreg sheet 15 includes the long sheet-shaped prepreg 15a and release paper 15b bonded to a surface of the prepreg 15a.

As illustrated in FIGS. 1 and 2, the head device 11 includes a sheet supplying unit 2, a lay-up unit 3, and a sheet take-up unit 4 as main components. The sheet supplying unit 2 supplies the prepreg sheet 15 from a raw-cloth roller 21 around which the prepreg sheet 15 is wound. The lay-up unit 3 lays up the prepreg 15a on a receiving surface 17a (top surface of a working table 17 in the illustrated example) by pressing the prepreg sheet 15 against the receiving surface 17a. The sheet take-up unit 4 takes up the release paper 15b that is separated from the prepreg 15a.

The head device 11 according to the present embodiment includes a support frame 11a as a main component, the support frame 11a including a pair of support plates 11b and 11b arranged in an axial direction of the raw-cloth roller 21 with a gap therebetween. The above-described units 2, 3, and 4 are supported by the support frame 11a in a space between the support plates 11b and 11b of the support frame 11a. In the present embodiment, the head device 11 includes a tension roller 11e for detecting the tension of the prepreg sheet 15, a cutter 11g that cuts only the prepreg 15a of the prepreg sheet 15, an edge sensor 11i that detects the position of an edge of the prepreg sheet 15, and a winding diameter sensor 11n that detects the winding diameter of the raw-cloth roller 21, all of which are disposed between the sheet supplying unit 2 and the lay-up unit 3.

In the following description, each of the units 2, 3, and 4 will be described in detail. In the following description, "lay-up direction" is a direction in which the head device 11 is moved in a lay-up operation, and "width direction" is a horizontal direction that is orthogonal to the lay-up direction.

The sheet supplying unit 2 includes the raw-cloth roller 21, around which the prepreg sheet 15 is wound, and a let-off driving mechanism 22 that rotates the raw-cloth roller 21.

The raw-cloth roller 21 is rotatably supported by a feeding shaft 11c in a space between the pair of support plates 11b and 11b of the support frame 11a. More specifically, the raw-cloth roller 21 has a through hole 21a that extends therethrough in the axial direction at the center thereof, and is supported by the feeding shaft 11c that extends through the through hole 21a. The feeding shaft 11c is rotatably supported, at one end portion thereof, by one of the pair of support plates 11b and 11b through a bearing or the like (not shown). In other words, the feeding shaft 11c is supported in a cantilever manner by the one of the pair of support plates 11b and 11b of the support frame 11a. The raw-cloth roller 21 is fitted to the feeding shaft 11c in a non-rotatable manner, so that the raw-cloth roller 21 is supported so as to be rotatable relative to the support frame 11a (support plates 11b and 11b).

The let-off driving mechanism 22 includes a feed motor M1, which is a servo motor that serves as a drive source, and a driving-force transmission mechanism 23 that transmits rotation of an output shaft of the feed motor M1 to the feeding shaft 11c. In the illustrated example, the driving-force transmission mechanism 23 includes a gear train 23a or the like, and connects the output shaft of the feed motor M1 to the above-described end portion of the feeding shaft 11c. With this structure, in the sheet supplying unit 2, the raw-cloth roller 21 is rotated by the feed motor M1, and the amount of rotation of the raw-cloth roller 21 can be controlled when the prepreg sheet 15 is fed.

The lay-up unit 3 is disposed behind the sheet supplying unit 2 in the lay-up direction and below the sheet supplying unit 2 in the up-down direction (Z-axis direction FIGS. 1 and 2). The lay-up unit 3 includes a lay-up head 31 that presses the prepreg sheet 15 against the receiving surface 17a, and a pressing driving mechanism 32 that supports the lay-up head 31 and includes a mechanism for moving the lay-up head 31 in the up-down direction. The pressing driving mechanism 32 includes a lay-up motor M3, which is a servo motor that serves as a drive source, and a drive converting mechanism 33 that converts a rotation of an output shaft of the lay-up motor M3 into a movement of the lay-up head 31 in the up-down direction.

In the illustrated example, the drive converting mechanism 33 includes a ball screw mechanism. The ball screw mechanism includes a screw shaft 33a that is connected to the output shaft of the lay-up motor M3, a nut bracket 33b that meshes with the screw shaft 33a and supports the lay-up head 31, and a linear rail 33c that prevents the nut bracket 33b from rotating and guides the movement of the nut bracket 33b in the up-down direction. In the illustrated example, the nut bracket 33b includes a nut portion that meshes with the screw shaft and a bracket portion that extends downward from a portion of an outer peripheral surface of the nut portion to a position further downward than the linear rail 33c.

With this structure, in the lay-up unit 3, the lay-up motor M3 rotates the screw shaft 33a so that the nut bracket 33b moves in the up-down direction along the screw shaft 33a and the linear rail 33c.

The lay-up head 31 has a substantially triangular cross section along a plane orthogonal to the longitudinal direction thereof (direction perpendicular to FIG. 2). The lay-up head 31 is supported in the space between the pair of support plates 11b and 11b by the nut bracket 33b of the pressing driving mechanism 32 such that the longitudinal direction thereof is parallel to the axis of the raw-cloth roller 21 and the center thereof coincides with the center of the raw-cloth roller 21 in the width direction. Therefore, when the screw shaft 33a is rotated by the lay-up motor M3 so that the nut bracket 33b is moved in the up-down direction as described above, the lay-up head 31 moves in the up-down direction together with the nut bracket 33b.

The sheet take-up unit 4 is disposed behind the lay-up unit 3 in the lay-up direction and above the lay-up unit 3 in the up-down direction. The sheet take-up unit 4 includes a take-up roller 41 that takes up the release paper 15b separated from the prepreg 15a of the prepreg sheet 15 and a take-up driving mechanism 42 that rotates the take-up roller 41.

The take-up roller 41 is rotatably supported by a take-up shaft 11d in the space between the pair of support plates 11b and 11b. More specifically, the take-up roller 41 has a through hole 41a that extends therethrough in the axial direction at the center thereof, and is supported by the take-up shaft 11d that extends through the through hole 41a. The take-up shaft 11d is rotatably supported, at one end portion thereof, by one of the pair of support plates 11b and 11b through a bearing or the like (not shown). In other words, the take-up shaft 11d is supported in a cantilever manner by the one of the pair of support plates 11b and 11b of the support frame 11a. Here, the one of the pair of support plates 11b and 11b is the same support plate as the support plate that supports the feeding shaft 11c in the sheet supplying unit 2. The take-up roller 41 is fitted to the take-up shaft 11d in a non-rotatable manner, so that the take-up roller 41 is supported so as to be rotatable relative to the support frame 11a (support plates).

The take-up driving mechanism 42 includes a take-up motor M2, which is a servo motor that serves as a drive source, and a driving-force transmission mechanism 43 that transmits rotation of an output shaft of the take-up motor M2 to the take-up shaft 11d. In the illustrated example, the driving-force transmission mechanism 43 includes a gear train 43a or the like, and connects the output shaft of the take-up motor M2 to the above-described end portion of the take-up shaft 11d. With this structure, in the sheet take-up unit 4, the take-up roller 41 is rotated by the take-up motor M2, and takes up the release paper 15b separated from the prepreg 15a while the torque thereof is maintained constant (by torque control).

In the head device 11 including the sheet supplying unit 2, the lay-up unit 3, and the sheet take-up unit 4, the prepreg sheet 15 fed from the raw-cloth roller 21 of the sheet supplying unit 2 is guided to a bottom end portion of the lay-up head 31 of the lay-up unit 3. Then, the lay-up head 31 is moved downward by the pressing driving mechanism 32 of the lay-up unit 3, so that the prepreg sheet 15 is pressed against the receiving surface 17a by the bottom end portion of the lay-up head 31.

As a result of the pressing process, the prepreg 15a of the prepreg sheet 15 adheres to the receiving surface 17a. Although the receiving surface 17a is the top surface of the working table 17 in the illustrated example, the receiving surface 17a is not limited to this, and may instead be the top surface of the prepreg 15a placed on the top surface of the working table 17 in the previous lay-up operation. While the prepreg 15a of the prepreg sheet 15 adheres to the receiving surface 17a, the release paper 15b becomes separated from the prepreg 15a as a result of the pressing process since the release paper 15b is guided from the pressing position toward the sheet take-up unit 4. Then, the release paper 15b that has been separated from the prepreg 15a is wound around the take-up roller 41 in the sheet take-up unit 4.

Thus, in the head device 11, the prepreg sheet 15 fed from the raw-cloth roller 21 is referred to as the prepreg sheet 15 only on a path from the raw-cloth roller 21 to the lay-up head 31, and only the release paper 15b separated from the prepreg 15a is present on a path from the lay-up head 31 to the sheet take-up unit 4.

The tension roller 11e is disposed between the sheet supplying unit 2 and the lay-up unit 3 so as to be in contact with the separation-paper-15b-side surface of the prepreg sheet 15, and is rotatably supported by the support frame 11a. The tension roller 11e is arranged so that the path along which the prepreg sheet 15 passes the tension roller 11e and is guided toward the lay-up head is bent. Thus, the tension roller 11e receives a load based on the tension of the prepreg sheet 15.

The tension roller 11e is supported by the support frame 11a such that a load cell and a support member or the like connected to the load cell (neither is illustrated) are disposed between the tension roller 11e and the support frame 11a. Therefore, when the load based on the tension of the prepreg sheet 15 is placed on the tension roller 11e as described above, the load is detected by the load cell, and the tension of the prepreg sheet 15 is detected on the basis of the detected load.

Although not described in detail herein, in the lay-up operation, the detected tension of the prepreg sheet 15 is used for the drive control of the feed motor M1 included in the let-off driving mechanism 22 of the sheet supplying unit 2. More specifically, the detected tension value is compared with a preset target value to determine a deviation therebetween, and the driving operation of the feed motor M1 is controlled by correcting the basic speed of the feed motor M1 on the basis of the deviation. Thus, the tension of the prepreg sheet 15 is controlled so as to be maintained at the desired value.

The cutter 11g is disposed between the tension roller 11e and the lay-up unit 3 so as to be supported by the support frame 11a. The cutter 11g is arranged so as to oppose the prepreg 15a of the prepreg sheet 15 such that the longitudinal direction of a cutting edge 11h of the cutter 11g is the same as the width direction of the prepreg sheet 15. The cutter 11g moves toward the prepreg 15a of the prepreg sheet 15, and cuts only the prepreg 15a of the prepreg sheet 15 (without cutting the release paper 15b). Thus, the prepreg sheet 15 is guided toward the lay-up head after only the prepreg 15a is cut by the cutter 11g at a location between the tension roller 11e and the lay-up unit 3.

The edge sensor 11i is disposed between the cutter 11g and the lay-up unit 3 so as to be supported by the support frame 11a. The edge sensor 11i is a sensor for detecting the position of an edge of the prepreg sheet 15, and includes a light emitting unit 11j and a light receiving unit 11k that oppose each other with the prepreg sheet 15 disposed therebetween.

More specifically, in the width direction, the light emitting unit 11j and the light receiving unit 11k are arranged such that the edge of the prepreg sheet 15 is disposed in a region toward which the light emitting unit 11j emits light. The amount of light emitted from the light emitting unit 11j toward the edge of the prepreg sheet 15 (amount of received light) is measured by the light receiving unit 11k, and a detection signal that corresponds to the amount of received light is output. When the position of the edge of the prepreg sheet 15 is constant, the amount of received light measured by the light receiving unit 11k is also constant. However, when the position of the edge changes, the amount of received light also changes. Therefore, the displacement of the edge can be determined from the detection signal output in accordance with the degree of change in the amount of received light.

The position of the edge of the prepreg sheet 15 is detected to determine the displacement (position shift) of the prepreg sheet 15 in the width direction. Even when the prepreg sheet 15 is displaced in the width direction, the size of the prepreg sheet 15 in the width direction hardly changes. Therefore, it can be assumed that displacements (directions and amounts) of both edges of the prepreg sheet 15 are equal to each other. Accordingly, it is sufficient to detect the position of one of the edges. Therefore, in the present embodiment, the edge sensor 11i is provided near one of the edges of the prepreg sheet 15.

The edge sensor 11i, which is a detector for detecting the position of an edge of the prepreg sheet 15, may instead be provided at each edge of the prepreg sheet 15, and the displacements of the edges may be determined on the basis of the detection values obtained by the respective detectors. Such a detector is not limited to the above-described edge sensor 11i, and may instead be a detector including an imaging device, such as a camera, that detects a change in the position of the corresponding edge by capturing an image of the prepreg sheet 15.

The winding diameter sensor 11n is disposed near the raw-cloth roller 21 of the sheet supplying unit 2 so as to be supported by the support frame 11a. The winding diameter sensor 11n is a sensor for detecting the winding diameter of the raw-cloth roller 21 supported by the feeding shaft 11c. In the illustrated example, the winding diameter sensor 11n is a non-contact distance sensor that is arranged so as to oppose the surface of the raw-cloth roller 21. The winding diameter of the raw-cloth roller 21 is determined on the basis of the distance to the surface of the raw-cloth roller 21 measured by the distance sensor. The winding diameter sensor 11n is not limited to the distance sensor. For example, a swingable arm (not shown) may be provided on the support frame 11a such that an end thereof is in contact with the surface of the raw-cloth roller 21, and a swing angle of the arm may be detected by using an angle sensor (not shown).

In the present embodiment, as illustrated in FIG. 1, the support mechanism 12 is a double-housing mechanism on which the head device 11 is supported (suspended). The support mechanism 12 includes a pair of side rails 12a and 12a, a double-housing gantry unit 6 including a pair of columns 61 and 61 provided on the respective rails 12a and 12a and a crossbeam 62 that extends between the columns 61 and 61, and a saddle unit 7 that is supported on the crossbeam 62 and supports the head device 11.

Each of the components of the support mechanism 12 will now be described.

The pair of side rails 12a and 12a serve as a base of the support mechanism 12, and are laid on the floor so as to be parallel to each other with the working table 17, on which the prepreg 15a is laid up, disposed therebetween. Each side rail 12a has a guide rail 12b on the top surface thereof at the center of the side rail 12a in the width direction, the guide rail 12b extending in the longitudinal direction of the side rail 12a. In the following description, the longitudinal direction of each side rail 12a (Y-axis direction in FIG. 1) is referred to also as a "front-back direction", and the width direction of each side rail 12a (horizontal direction orthogonal to the direction in which the side rail 12a extends, or X-axis direction in FIG. 1) is referred to also as a "left-right direction".

The gantry unit 6 is a double-housing mechanism that supports the head device 11 with the saddle unit 7, and includes a double-housing structure as a main body. The double-housing structure includes the pair of columns 61 and 61 that stand on the respective side rails 12a and 12a and the crossbeam 62 that extends between the columns 61 and 61. In addition, in the gantry unit 6, a slide base 63 is interposed between each side rail 12a and the corresponding column 61 to support the column 61, and a slide driving mechanism 64 is provided for each slide base 63 to move the slide base 63.

Each column 61 is a rectangular-column-shaped member that stands on the corresponding side rail 12a with the corresponding slide base 63 interposed therebetween. More specifically, each slide base 63 is disposed on the corresponding side rail 12a in a movable manner such that the slide base 63 is fitted to and guided by the guide rail 12b, and each column 61 is arranged so as to stand on the corresponding slide base 63. Each slide base 63 is driven by the corresponding slide driving mechanism 64, which is disposed between the slide base 63 and the side rail 12a, so as to move in the longitudinal direction of the side rail 12a (front-back direction).

Each slide driving mechanism 64 includes a Y-axis motor M4, which is a servo motor that serves as a drive source attached to the corresponding slide base 63, a pinion gear 64a connected to an output shaft of the Y-axis motor M4, and a rack 64b attached to the corresponding side rail 12a. More specifically, the Y-axis motor M4 is attached to a side surface of the slide base 63 in the width direction (left-right direction) (inner surface (surface facing the working table 17) in the illustrated example). Also, the rack 64b is attached to a side surface of the side rail 12a at the same side such that the rack 64b extends in the longitudinal direction of the side rail 12a. The pinion gear 64a that is fixed to the output shaft of the Y-axis motor M4 meshes with the rack 64b. With this structure, when the Y-axis motors M4 and M4 attached to the respective slide bases 63 and 63 are synchronously driven, the slide bases 63 and 63 move in the front-back direction (longitudinal direction of each side rail 12a) and the columns 61 and 61 simultaneously move in the front-back direction, so that the entire body of the gantry unit 6 including the crossbeam 62 move in the front-back direction.

The crossbeam 62 extends between the pair of columns 61 and 61 so as to extend in a direction orthogonal to the longitudinal direction of each side rail 12a (left-right direction). In the illustrated example, the crossbeam 62 includes a pair of rectangular-column-shaped beam members 62a and 62a. Each beam member 62a is attached to an upper portion of each column 61 at the ends thereof so that each column 61 is sandwiched between the beam members 62a and 62a in the front-back direction.

The saddle unit 7 is a mechanism that supports the head device 11 on the crossbeam 62 such that the head device 11 is suspended from the saddle unit 7. The saddle unit 7 includes a saddle base 71 from which the head device 11 is suspended so as to be rotatable around an axis in the up-down direction (axis parallel to the Z-axis direction in FIG. 1, hereinafter referred to as a "C-axis"), a head driving mechanism 72 for rotating the head device 11 around the C-axis, and a saddle driving mechanism 73 for moving the saddle base 71.

The saddle base 71 is movably provided on the crossbeam 62, and a shaft member 74 which retains the head device 11 is attached to the saddle base 71. In more detail, in the illustrated example, the saddle base 71 has a plate-shaped structure and placed on the top surface of the crossbeam 62 (pair of beam members 62a and 62a) so as to be movable in the longitudinal direction of the crossbeam 62 (left-right direction). More specifically, each beam member 62a has a rail (not shown) that extends in the longitudinal direction (left-right direction) on the top surface thereof, and the saddle base 71 has grooves that extend in the left-right direction in the bottom surface thereof, each groove being fitted to the corresponding rail. Thus, the grooves in the saddle base 71 are fitted to the respective rails on the crossbeam 62 (beam members 62a and 62a), so that the saddle base 71 is movable (slidable) in the direction in which the rails extend, that is, in the longitudinal direction of the crossbeam 62.

The shaft member 74, which has a columnar shape, is attached to the saddle base 71 so as to extend from the bottom surface of the saddle base 71. More specifically, the saddle base 71 has a through hole (not shown) at the center thereof (at a position between the pair of beam members 62a and 62a of the crossbeam 62 in the state in which the saddle base 71 is placed on the crossbeam 62), and the shaft member 74 is attached to the saddle base 71 by being inserted through the through hole.

The shaft member 74 is attached to the saddle base 71 at the top end thereof, and extends downward from the saddle base 71. In addition, the shaft member 74 is rotatably supported by the saddle base 71 through a bearing or the like (not shown). The head device 11 is attached to the bottom end of the shaft member 74, so that the head device 11 is supported on (suspended from) the saddle base 71, that is, the crossbeam 62, by the shaft member 74.

The shaft member 74 is supported by the saddle base 71 by being inserted through the through hole formed in the saddle base 71, and is connected to the head driving mechanism 72, which is attached to the saddle base 71, at the top end thereof. The shaft member 74 is rotated around the C-axis (around the central axis of the shaft member 74 (C-axis)) by the head driving mechanism 72.

The head driving mechanism 72 includes a C-axis motor M6, which is a servo motor that serves as a drive source, and a driving-force transmission unit 72a that includes a conversion mechanism for converting a rotation of an output shaft of the C-axis motor M6 into a rotation of the shaft member 74 around the C-axis. The conversion mechanism included in the driving-force transmission unit 72a may be, for example, a worm gear mechanism or a bevel gear mechanism. The driving-force transmission unit 72a is configured to connect a shaft member (not shown) connected to the top end of the shaft member 74, which is supported by the saddle base 71, to the output shaft of the C-axis motor M6 with the above-described conversion mechanism.

With this structure, when the C-axis motor M6 is driven, the shaft member 74 is rotated around the C-axis. Accordingly, the head device 11, which is supported by the shaft member 74, is rotated around the C-axis.

The saddle driving mechanism 73 includes an X-axis motor M5, which is a servo motor that serves as a drive source attached to the saddle base 71, a pinion gear 73a connected to an output shaft of the X-axis motor M5, and a rack 73b attached to the crossbeam 62. More specifically, the X-axis motor M5 is attached to one of the side surfaces of the saddle base 71 that are parallel to the crossbeam 62 (front surface in the illustrated example). The rack 73b is attached to one of the pair of beam members 62a and 62a of the crossbeam 62 that is adjacent to the one of the side surfaces of the saddle base 71. The rack 73b extends in the longitudinal direction of the crossbeam 62. The pinion gear 73a that is fixed to the output shaft of the X-axis motor M5 meshes with the rack.

With this structure, when the X-axis motor M5 attached to the saddle base 71 is driven, the entire body of the saddle unit 7 including the saddle base 71 is moved in the left-right direction (longitudinal direction of the crossbeam 62). Accordingly, the head device 11, which is suspended from the saddle unit 7, is also moved in the left-right direction.

In the automatic lay-up machine 10 according to the present embodiment having the above-described structure, as illustrated in FIG. 3, the motors M1 to M6 for driving the head device 11 and the units 6 and 7 of the support mechanism 12 are connected to a lay-up device controller 13, which is a main controller, and driving operations thereof are controlled by the lay-up device controller 13. An input device 14 is connected to the lay-up device controller 13. The input device 14 is operated when the lay-up operation of the automatic lay-up machine 10 is to be started, and is used, for example, to output a command signal for starting the lay-up operation to the lay-up device controller 13.

The lay-up device controller 13 includes storage means (memory (not shown)) installed therein, and the storage means stores an operation program for controlling the driving operations of the motors M1 to M6 of the support mechanism 12 and the head device 11 in, for example, the lay-up operation. The operation program is, for example, created by an external personal computer or the like, transferred to the storage means through the input device 14, and stored in the storage means.

In the lay-up operation, the lay-up device controller 13 drives the motors M1 to M6 in accordance with the operation program stored in the storage means. Accordingly, the driving operations of the motors M1 to M6 are controlled so as to follow the operation procedures according to the operation program. As a result, the operation of the head device 11 performed by the support mechanism 12 and the operations of the components included in the head device 11 are executed. The operation of the head device 11 and the operations of the components included in the head device 11 are executed as follows.

To move the head device 11 in the front-back direction (Y-axis direction FIG. 1), the lay-up device controller 13 drives the left and right Y-axis motors M4 and M4 included in the respective slide driving mechanisms 64 and 64 of the gantry unit 6 so that the output shafts of the Y-axis motors M4 and M4 are rotated in rotational directions corresponding to the direction of the movement and by an amount corresponding to the amount of the movement. Accordingly, as described above, the Y-axis motors M4 and M4 are synchronously driven so that the entire body of the gantry unit 6 including the crossbeam 62 is moved in the front-back direction. As a result, the head device 11 supported by the saddle unit 7 on the crossbeam 62 of the gantry unit 6 is moved in the front-back direction.

To move the head device 11 in the left-right direction (X-axis direction in FIG. 1), the lay-up device controller 13 drives the X-axis motor M5 included in the saddle driving mechanism 73 of the saddle unit 7 so that the output shaft of the X-axis motor M5 is rotated in a rotational direction corresponding to the direction of the movement and by an amount corresponding to the amount of the movement. Accordingly, as described above, the entire body of the saddle unit 7 is moved in the left-right direction. As a result, the head device 11 supported by the saddle unit 7 is moved in the left-right direction.

To move the head device 11 in an oblique direction, the lay-up device controller 13 drives the left and right Y-axis motors M4 and M4 included in the respective slide driving mechanisms 64 and 64 of the gantry unit 6 and the X-axis motor M5 included in the saddle driving mechanism 73 of the saddle unit 7 so that the output shafts thereof are synchronously rotated by amounts corresponding to the amount of the movement in the oblique direction, that is, by amounts corresponding to the amounts of movements in the front-back and left-right directions that correspond to the movement in the oblique direction. Thus, the movement of the gantry unit 6 in the front-back direction and the movement of the saddle unit 7 in the left-right direction are performed synchronously. As a result, the head device 11 supported by the saddle unit 7 on the crossbeam 62 of the gantry unit 6 is moved in the oblique direction.

To rotate the head device 11 around the C-axis, the lay-up device controller 13 drives the C-axis motor M6 included in the head driving mechanism 72 of the saddle unit 7 so that the output shaft of the C-axis motor M6 is rotated in a direction corresponding to the rotational direction of the head device 11 and by an amount corresponding to the rotational angle (amount of rotation) of the head device 11. Accordingly, the shaft member 74 is rotated round the C-axis, and the head device 11 supported (retained) by the shaft member 74 is rotated around the C-axis as a result.

To move the head device 11 in the width direction (horizontal direction orthogonal to the lay-up direction), when the lay-up direction is the Y-axis direction, the lay-up device controller 13 drives the X-axis motor M5 so that the head device 11 is moved in the X-axis direction. When the lay-up direction is the X-axis direction, the lay-up device controller 13 drives each Y-axis motor M4 so that the head device 11 is moved in the Y-axis direction. When the lay-up direction is an oblique direction, the lay-up device controller 13 drives each Y-axis motor M4 and the X-axis motor M5 synchronously so that the head device 11 is moved in a direction orthogonal to the oblique direction.

In the lay-up operation, that is, when the head device 11 is moved in the lay-up direction, the lay-up device controller 13 drives the feed motor M1 included in the let-off driving mechanism 22 of the sheet supplying unit 2 so that the raw-cloth roller 21 (feeding shaft 11c) is rotated at a speed corresponding to the movement speed of the head device 11. More specifically, the lay-up device controller 13 is connected to the winding diameter sensor 11n so that the winding diameter signal from the winding diameter sensor 11n is input to the lay-up device controller 13. The lay-up device controller 13 determines a basic speed on the basis of the movement speed of the head device 11 according to the operation program and the winding diameter of the raw-cloth roller 21 determined on the basis of the winding diameter signal from the winding diameter sensor 11n, and drives the feed motor M1 at a rotational speed based on the basic speed.

As illustrated in FIG. 3, the lay-up device controller 13 is connected to a load cell 11f provided to detect the tension of the prepreg sheet 15 through the above-described tension roller 11e. A load signal corresponding to the tension of the prepreg sheet 15 is input to the lay-up device controller 13 from the load cell 11f. The lay-up device controller 13 detects the tension of the prepreg sheet 15 on the basis of the load signal input from the load cell 11f, corrects the basic speed on the basis of the detected tension value and a target tension value as described above, and drives the feed motor M1 in accordance with the corrected basic speed. Thus, the prepreg sheet 15 is fed from the raw-cloth roller 21 by a feeding rate that corresponds to the movement speed of the head device 11 and at which the tension can be maintained at the target tension value.

In addition, when the lay-up operation is started, or when a movement of the head device 11 is started in an operation other than the lay-up operation, the lay-up device controller 13 drives the lay-up motor M3 included in the pressing driving mechanism 32 of the lay-up unit 3 to move the lay-up head 31 in the up-down direction (Z-axis direction in FIGS. 1 and 2).

The movement of the lay-up head 31 in the up-down direction will now be described. With regard to the downward movement, to establish a state in which an end portion of the prepreg sheet 15 is pressed against the receiving surface 17a by the lay-up head 31 at the start of the lay-up operation, the lay-up head 31 is moved downward (lowered) to a position where the prepreg sheet 15 is pressed against the receiving surface 17a (hereinafter referred to as a "pressing position"). When the lay-up head 31 is at the pressing position, the lay-up device controller 13 performs torque control for the lay-up motor M3 so that the end portion of the prepreg sheet 15 is pressed against the receiving surface 17a by a constant force. With regard to the upward movement of the lay-up head 31, when, for example, the movement of the head device 11 toward a starting point of the lay-up position for the next lay-up operation is started, the lay-up head 31 is moved upward (raised) to a position separated from the receiving surface 17a (hereinafter referred to as a "retracted position").

The lay-up device controller 13 drives the take-up motor M2 included in the take-up driving mechanism 42 of the sheet take-up unit 4 while performing torque control thereof. Accordingly, as described above, the take-up roller 41 takes up the release paper 15b separated from the prepreg 15a such that the tension of the release paper 15b is maintained constant.

The lay-up device controller 13 performs the lay-up operation or the like by driving the motors M1 to M6 so that the above-described operation of the head device 11 and the operations of the components included in the head device 11 are executed in accordance with the operation program. More specifically, the lay-up operation or the like is carried out by steps (1) to (8) described below. The steps are set in the above-described operation program.

(1) When an operator operates the input device 14 to start the lay-up operation, first, the lay-up device controller 13 drives each motor M4 and/or the motor M5 in accordance with the operation program to move the head device 11 from the standby position (current position) to the starting point of the lay-up position. More specifically, in the state in which the lay-up head 31 is at the retracted position (at an upper position in a standby state), the lay-up device controller 13 drives each Y-axis motor M4 and/or the X-axis motor M5 so that the head device 11 is moved to the starting point of the lay-up position. Accordingly, the head device 11 is moved in the front-back direction and/or the left-right direction to the starting point of the lay-up position.

(2) When the head device 11 reaches the starting point of the lay-up position, the lay-up device controller 13 drives the C-axis motor M6 to make the orientation (movement direction) of the head device 11 match the lay-up direction. Accordingly, the head device 11 rotates around the central axis of the shaft member 74 of the saddle unit 7 (around the C-axis), so that the orientation (movement direction) thereof matches the lay-up direction. The rotation angle of the head device 11 is determined on the basis of the orientation of the head device 11 at the time when the head device 11 is moved to the starting point of the lay-up position (current angle) and the lay-up direction of the next lay-up operation set in the operation program.

(3) At the starting point of the lay-up position, the lay-up device controller 13 drives the lay-up motor M3 to move the lay-up head 31 to the pressing position. Accordingly, the lay-up head 31 is moved downward toward the pressing position, and presses the end portion of the prepreg sheet 15 against the receiving surface 17a when the lay-up head 31 reaches the pressing position.

(4) When the movement of the lay-up head 31 to the pressing position is completed, the lay-up device controller 13 detects the tension of the prepreg sheet 15 through the load cell 11f. When the detected value is not equal to the target tension value, the lay-up device controller 13 drives the feed motor M1 to rotate the raw-cloth roller 21. More specifically, when the detected value of the tension of the prepreg sheet 15 is higher than the target tension value, the feed motor M1 is driven in a direction for feeding the prepreg sheet 15. When the detected value of the tension is lower than the target tension value, the feed motor M1 is driven in a direction for retracting the prepreg sheet 15.

(5) After the above-described step (4), the lay-up device controller 13 drives each Y-axis motor M4 and/or the X-axis motor M5 to move the head device 11 in the lay-up direction, and also drives the feed motor M1 as described above, while performing torque control of the lay-up motor M3 to maintain the state in which the end portion of the prepreg sheet 15 is pressed against the receiving surface 17a by the lay-up head 31. Accordingly, the lay-up operation is performed in which the prepreg sheet 15 is fed from the raw-cloth roller 21 and the prepreg 15a is laid up on the receiving surface 17a as a result of the movement of the head device 11 (lay-up head 31). In addition, in the lay-up operation, the lay-up device controller 13 drives the take-up motor M2 so that the release paper 15b separated from the prepreg 15a in the lay-up operation is taken up while the tension thereof is maintained constant. To move the head device 11 in the lay-up direction, each motor M4 and the motor M5 are driven as described above. In addition, as described above, the tension of the prepreg sheet 15 fed from the raw-cloth roller 21 is maintained at the target tension during the lay-up operation.

(6) Then, when the head device 11 reaches a position at which the prepreg 15a is laid up by a predetermined length set in the operation program (end point of the lay-up position), the motors that have been driven to move the head device 11 in the lay-up direction are stopped. The lay-up device controller 13 drives the cutter 11g included the head device 11 when the head device 11 is at a position in front of the end point of the lay-up position. Accordingly, the prepreg 15a of the prepreg sheet 15 is cut by the cutter 11g. The position in front of the end point of the lay-up position is a position separated from the end point of the lay-up position in the lay-up direction by the distance between the cutter 11g and the bottom end portion of the lay-up head 31 along the path of the prepreg sheet 15 in the head device 11. Since the prepreg 15a is cut at the position in front of the end point of the lay-up position, when the head device 11 (lay-up head 31) reaches the end point of the lay-up position, the end portion of the prepreg sheet 15 (cut portion of the prepreg 15a) is at the end point of the lay-up position.

(7) When the head device 11 reaches the end point of the lay-up position, as described above, the lay-up device controller 13 stops driving the motors that have been driven to move the head device 11 in the lay-up direction, thereby stopping the movement of the head device 11. In addition, the lay-up device controller 13 also drives the lay-up motor M3 to move the lay-up head 31 upward to the retracted position. Then, similar to the above-described step (1), the lay-up device controller 13 drives each Y-axis motor M4 and/or the X-axis motor M5 to move the head device 11 to the starting point of the lay-up position for the next lay-up operation.

(8) The lay-up operation for laying up the prepreg 15a on the receiving surface 17a is performed by repeatedly driving the motors M1 to M6 with the lay-up device controller 13 in the above-described way. In the case where the lay-up direction for the current lay-up operation is the same as the lay-up direction for the next lay-up operation, the above-described step (2) is omitted.

In the above-described lay-up operation performed by the automatic lay-up machine 10, the prepreg sheet 15 is displaced in the width direction due to the internal stress in the prepreg sheet 15 (prepreg 15a) fed from the raw-cloth roller 21. The steps of a method for correcting the position of the prepreg sheet 15 in the width direction to eliminate the displacement will be described with reference to FIGS. 4A to 7B in the order of steps [1] to [8]. In FIGS. 4B, 5B, 6B, and 7B, the dashed lines L1 show the straight lines that connect the edges of the raw-cloth roller 21 and the take-up roller 41 in the width direction. The dashed lines L1 show the positions of both edges of the prepreg sheet 15 and the release paper 15b in the width direction in the case where the prepreg sheet 15 is not displaced in the width direction. The dashed lines L2, which are displaced from the dashed lines L1 in the width direction, show the positions of the edges of the prepreg sheet 15 in the width direction at the position of the lay-up head 31 in the case where the prepreg sheet 15 is displaced in the width direction. The distance Δ from the dashed lines L1 to the respective dashed lines L2 shows the amount of displacement that has occurred.

[1] In a first step, first, the above-described step (1) or (7) of the lay-up operation is performed to move the head device 11 to the starting point P1 of the lay-up position, and the above-described step (2) is performed so that the orientation (movement direction) of the head device 11 matches the lay-up direction, as illustrated in FIGS. 4A and 4B. Thus, the position of the raw-cloth roller 21 coincides with the lay-up position in the width direction.

Here, assume that the prepreg sheet 15 is displaced in the width direction. In such a case, as illustrated in FIG. 4B, in the state in which the position of the raw-cloth roller 21 coincides with the lay-up position in the width direction as a result of the first step, the positions of the edges of the raw-cloth roller 21 in the width direction (dashed lines L1) do not coincide with (are displaced by the distance $\Delta$ in the width direction from) the positions of the edges of the prepreg sheet 15 (dashed lines L2).

[2] Next, in the second step, the lay-up device controller 13 detects the position of one edge of the prepreg sheet 15 (hereinafter referred to simply as an "edge position") on the basis of the detection signal output from the edge sensor 11$i$, and determines a deviation of the edge position from the lay-up position (position of an end of the lay-up position in the width direction).

More specifically, the edge sensor 11$i$ outputs the detection signal corresponding to the amount of light received by the light receiving unit 11$k$ to the lay-up device controller 13, and the lay-up device controller 13 detects the edge position on the basis of the detection signal from the edge sensor 11$i$. As described above, since the amount of light received by the light receiving unit 11$k$ changes in accordance with a change in the edge position, the lay-up device controller 13 detects the edge position on the basis of the amount of received light represented by the detection signal.

The lay-up device controller 13 determines, on the basis of the result of the detection, whether or not the edge position is shifted from the lay-up position, that is, whether or not there is a displacement between the prepreg sheet 15 and the lay-up position in the width direction. When it is determined that there is a displacement, the lay-up device controller 13 determines, on the basis of the degree of change (amount of change) in the amount of received light, a direction of deviation between the edge position and the lay-up position, that is, a direction in which the edge position is displaced from the lay-up position (hereinafter referred to as a "deviation direction"), and the magnitude of the deviation, that is, the distance $\Delta$ between the edge position and the lay-up position in the width direction (hereinafter referred to as an "amount of deviation $\Delta$").

More specifically, with regard to the deviation direction, referring to FIG. 4B, when the edge position is displaced (shifted) toward the left (leftward) in the width direction, that is, when the deviation direction is leftward, the amount of light received by the edge sensor 11$i$ is increased. When the edge position is displaced (shifted) toward the right (rightward) in the width direction, that is, when the deviation direction is rightward, the amount of light received by the edge sensor 11$i$ is reduced. Accordingly, the lay-up device controller 13 determines the deviation direction based on whether the amount of received light is increased or reduced.

The amount of deviation $\Delta$ (distance $\Delta$ in FIG. 4B) changes in proportion to the amount by which the amount of received light is increased or reduced. As the leftward displacement (shift) of the edge position increases, the amount of received light increases in proportion to the distance by which the edge position is shifted (displaced). As the rightward displacement (shift) of the edge position increases, the amount of received light decreases in proportion to the distance by which the edge position is shifted (displaced). Accordingly, in the present embodiment, the proportional relationship between the amount of change in the amount of received light and the amount of deviation $\Delta$ is set in the lay-up device controller 13 in advance in the form of a mathematical expression, a table, or the like, and the lay-up device controller 13 determines the amount of deviation $\Delta$ on the basis of the amount of change in the amount of received light by using the function, table, or the like.

In the second step, in the case where the lay-up device controller 13 determines that the edge position is not shifted, that is, that there is no displacement between the prepreg sheet 15 and lay-up position as a result of the detection of the edge position, the lay-up device controller 13 carries out the lay-up operation (step (3) and the following steps of the lay-up operation) without carrying out the "third step" and the following steps described below.

[3] In a third step, on the basis of the deviation direction and the amount of deviation $\Delta$ determined in the second step, the lay-up device controller 13 drives the motors to move the head device 11 by the same amount as the amount of deviation $\Delta$ in a direction along the width direction for cancelling the deviation, that is, in a direction opposite to the deviation direction, as illustrated in FIG. 5B. Thus, a state in which the edge position and the lay-up position coincide with each other is established.

More specifically, the lay-up device controller 13 drives each Y-axis motor M4 and/or the X-axis motor M5 in accordance with the lay-up direction, which is set in the operation program, to move the head device 11 in the width direction, which is orthogonal to the lay-up direction. The lay-up device controller 13 also controls the driving amounts (amounts of rotation) of the motors so that the amount by which the head device 11 is moved in the width direction by the motors is the same amount as the amount of deviation $\Delta$. Thus, the head device 11 is moved by the same amount as the amount of deviation $\Delta$ rightward when the deviation direction determined in the second step is leftward, and leftward when the deviation direction determined in the second step is rightward.

Thus, as a result of the movement of the head device 11 in the direction for cancelling the deviation, the state in which the edge position and the lay-up position coincide with each other, that is, the state in which the prepreg sheet 15 is at the lay-up position in the width direction, is established. However, as a result of the movement of the head device 11, as illustrated in FIG. 5B, the position of the head device 11 (raw-cloth roller 21) in the width direction is displaced from the lay-up position by the amount of deviation $\Delta$ in a direction opposite to the deviation direction.

[4] In a fourth step, after the third step, the lay-up device controller 13 drives the lay-up motor M3 to move the lay-up head 31 toward the pressing position (downward). As illustrated in FIG. 6A, when the lay-up head 31 reaches the pressing position, the state in which the end portion of the prepreg sheet 15 is pressed against the receiving surface 17$a$ is established. Accordingly, the prepreg sheet 15 is pressed against the receiving surface 17$a$ in such a state that the end portion thereof is positioned at the starting point P1 of the lay-up position in the lay-up direction and the width direction.

[5] According to the present invention, a fifth step, which will be described below, is performed after the fourth step. However, in the present embodiment, a tension reducing step is performed between the fourth step and the fifth step. In the tension reducing step, the tension of the prepreg sheet 15 is reduced so that the force that presses the end portion of the prepreg sheet 15 and the lay-up head 31 against each other, that is, the pressing force applied therebetween, is reduced. The tension reducing step is performed so that, by reducing the pressing force, the head device 11 can be moved in the width direction without applying a large force and positioning of the head device 11 can be easily performed in the fifth step.

In the present embodiment, the tension reducing step is performed by driving the feed motor M1 so that the prepreg sheet 15 is fed from the raw-cloth roller 21. More specifically, the above-described operation program stores a feeding length (feeding amount) by which the prepreg sheet 15 is to be fed from the raw-cloth roller 21 in the tension reducing step. The lay-up device controller 13 determines the driving amount of the feed motor M1 on the basis of the feeding length and the current winding diameter of the raw-cloth roller 21 detected by the winding diameter sensor 11$n$, and drives the feed motor M1 by the determined driving amount in the direction for feeding the prepreg sheet 15. Thus, the prepreg sheet 15 is fed from the raw-cloth roller 21 by the feeding length, and the tension of the prepreg sheet 15 is reduced.

The drive control of the feed motor M1 is not limited to the above-described control, and the feed motor M1 may instead be driven such that the tension of the prepreg sheet 15 is adjusted to a predetermined tension value. More specifically, the lay-up device controller 13 may drive the feed motor M1 in the direction for feeding the prepreg sheet 15 while detecting (monitoring) the tension of the prepreg sheet 15 through the tension roller 11$e$, and stop driving the feed motor M1 when the tension is reduced to the predetermined tension value.

[6] In a fifth step, in the state in which the tension of the prepreg sheet 15 is reduced as a result of the tension reducing step, to reestablish the state in which the position of the head device 11 (raw-cloth roller 21) coincides with the lay-up position, the lay-up device controller 13 drives the motors to move the head device 11 in a direction opposite to the direction in which the head device 11 is moved in the third step, that is, in the deviation direction, by the amount of deviation Δ (amount of movement in the third step).

Figure 7A:
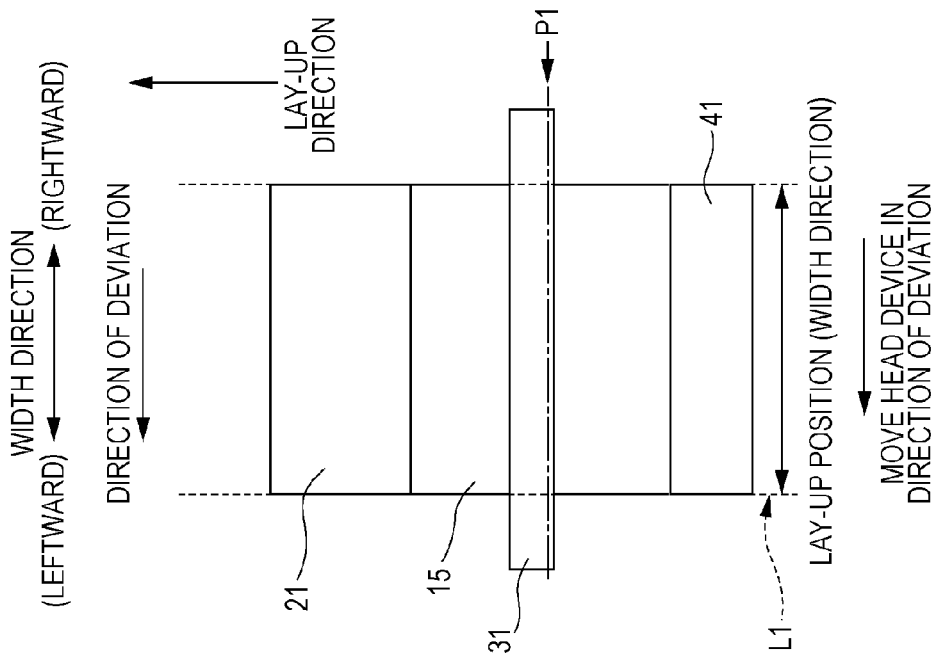
FIGS. 7A and 7B illustrate the automatic lay-up machine viewed in the width direction and from above (in the direction of arrow VIIB in FIG. 7A), respectively, in a fifth step of the lay-up-position correcting method.
Figure 7B:
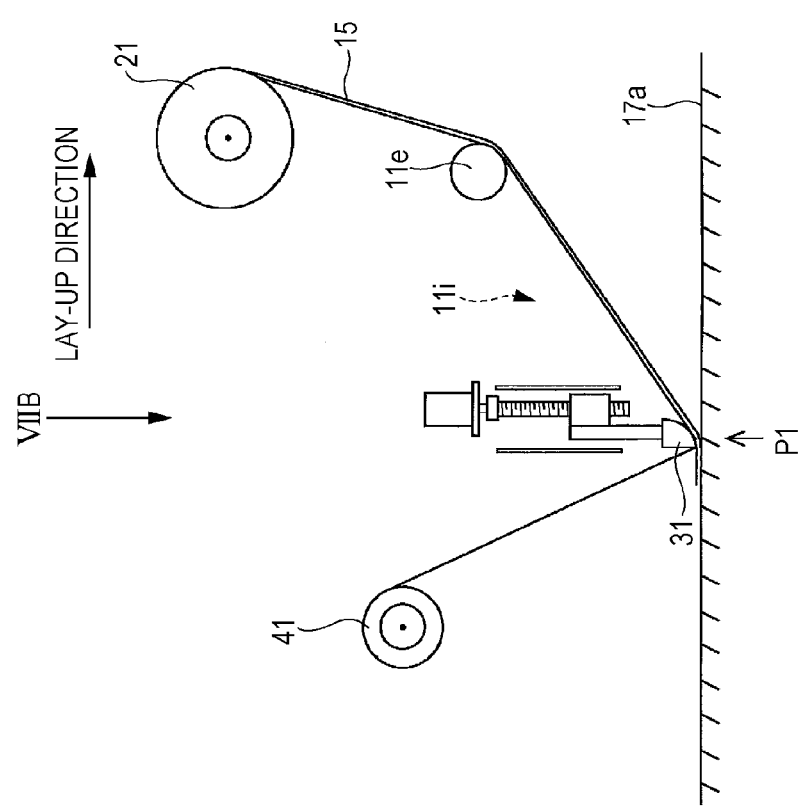

More specifically, to move the head device 11 in the deviation direction by the same amount as the amount of deviation Δ, the lay-up device controller 13 drives the motors driven in the third step (each Y-axis motor M4 and/or the X-axis motor M5) so that the output shafts of the motors are rotated in directions opposite to the rotational directions in the third step. The lay-up device controller 13 also controls the driving amounts (amounts of rotation) of the motors so that the amount by which the head device 11 is moved is the same as that in the third step. Accordingly, the head device 11 is moved leftward, as illustrated in FIG. 7B, in the case where the head device 11 is moved rightward in the third step, and rightward in the case where the head device 11 is moved leftward in the third step, by the same amount as the amount of deviation Δ.

In the fifth step, the head device 11 is moved in the width direction while the end portion of the prepreg sheet 15 is pressed against the receiving surface 17$a$ by the lay-up head 31. However, the end portion of the prepreg sheet 15 is not moved in the width direction in response to the movement of the head device 11. This will be described in more detail.

In the above-described fourth step, the end portion of the prepreg sheet 15 is pressed against the receiving surface 17$a$ by the lay-up head 31, so that the end portion of the prepreg sheet 15 is sandwiched between the receiving surface 17$a$ and the lay-up head 31 and retained at the starting point P1 of the lay-up position. In this state, in the fifth step, the head device 11 is moved in the width direction. When the head device 11 is moved, the lay-up head 31 slides along the prepreg sheet 15 (release paper 15$b$).

However, when the lay-up head 31 slides along the prepreg sheet 15, the end portion of the prepreg sheet 15 does not move together with the lay-up head 31. This is because, since the release paper 15$b$ of the prepreg sheet 15 generally has a smooth surface, the coefficient of friction between the lay-up head 31 and the release paper 15$b$ is small, and therefore the frictional resistance generated between the lay-up head 31 and the release paper 15$b$ during the above-described movement is small. Moreover, the frictional resistance is reduced because the pressing force between the lay-up head 31 and the release paper 15$b$ is reduced as a result of the tension reducing step performed before the fifth step. Since the end portion of the prepreg sheet 15 is retained by being sandwiched between the receiving surface 17$a$ and the lay-up head 31 as described above, and since the prepreg 15$a$ itself is adhesive, the retaining force is greater than the force applied to the prepreg sheet 15 in the direction of movement of the lay-up head 31 due to the frictional resistance when the lay-up head 31 is moved. Accordingly, the end portion of the prepreg sheet 15 does not move (displacement does not occur) when the head device 11 (lay-up head 31) is moved.

In addition, since the pressing force between the lay-up head 31 and the prepreg sheet 15 is reduced as a result of the above-described tension reducing step, the head device 11 can be moved in the width direction without applying a large force in the fifth step.

As a result of the fifth step, the position of the head device 11 coincides with the lay-up position again while the state in which the position of the end portion of the prepreg sheet 15 in the width direction (above-described edge position) coincides with the lay-up position is maintained. Accordingly, in the state in which the position of the raw-cloth roller 21 coincides with the lay-up position, the edge position coincides with the lay-up position, in other words, the displacement of the prepreg sheet 15 from the lay-up position is canceled (corrected).

[7] As described above, in the present embodiment, the tension of the prepreg sheet 15 is reduced in the tension reducing step. Therefore, after the fifth step, it is necessary to return (increase) the tension of the prepreg sheet 15 to that in the fourth and previous steps before the lay-up operation is started. Accordingly, a tension returning step is performed.

In the present embodiment, the tension returning step is performed by driving the feed motor M1 so as to rewind the prepreg sheet 15, which has been fed in the tension reducing step, around the raw-cloth roller 21. More specifically, to rewind the prepreg sheet 15 around the raw-cloth roller 21 by the same length as the above-described feeding length, the lay-up device controller 13 drives the feed motor M1 by the driving amount determined in the tension reducing step so that the output shaft of the feed motor M1 is rotated in a direction opposite to that in the tension reducing step. Accordingly, the prepreg sheet 15 is rewound around the raw-cloth roller 21 by the same length as the feeding length, and the tension of the prepreg sheet 15 returns to that in the fourth and previous steps.

In the case where the drive control of the feed motor M1 is performed by monitoring the tension of the prepreg sheet 15 in the tension reducing step, also in the tension returning step, the lay-up device controller 13 may drive the feed motor M1 while detecting (monitoring) the tension of the prepreg sheet 15 so that the tension of the prepreg sheet 15 is adjusted to the tension value for the lay-up operation set in advance in the operation program. Alternatively, in this case, the lay-up device controller 13 may store the driving amount (amount of rotation) of the feed motor M1 in the tension reducing step, and drive the feed motor M1 in a direction opposite to that in the tension reducing step by the stored driving amount (amount of rotation).

[8] As a result of the above-described steps [1] to [7], the deviation (displacement) of the prepreg sheet 15 in the width direction at the starting point P1 of the lay-up position is canceled. Then, the lay-up device controller 13 starts the lay-up operation by performing the above-described step (5) of the lay-up operation.

The present invention is not limited to the above-described embodiment, and various modifications are possible, as in the following embodiments.

(1) In the above-described embodiment, the support mechanism 12 included in the automatic lay-up machine 10 to which the present invention is applied has a double-housing structure in which the head device 11 is supported (suspended) between the pair of columns 61 and 61 that stand on the left and right sides of the working table 17. However, the automatic lay-up machine 10 to which the present invention is applied is not limited to those including the support mechanism 12 having a double-housing structure, and the support mechanism 12 may instead be structured as described in the following items 1) and 2).

1) For example, the support mechanism 12 that supports the head device 11 may have a cantilever structure. More specifically, a column 61 may be provided so as to stand on one side of the working table 17, and an arm (which corresponds to the crossbeam 62 in the above-described embodiment) may be arranged so as to extend from the column 61 toward the other side in the left-right direction. The head device 11 is supported on (suspended from) the arm by the saddle unit 7.

2) The automatic lay-up machine 10 to which the present invention is applied is not limited to those capable of performing the lay-up operation in three directions (front-back, left-right, and oblique directions) as in the above-described embodiment, and may instead be capable of performing the lay-up operation in only one direction (for example, in the front-back direction). Therefore, in such a case, the support mechanism 12 for realizing the movement of the head device 11 in the lay-up direction may have the following structure.

That is, for example, in the structure in which the head device 11 is supported on (suspended from) the crossbeam 62 (arm) of the support mechanism 12 by the saddle unit 7 as in the above-described embodiment and item 1), the head device 11 may be supported by the saddle unit 7 in a non-rotatable manner. Alternatively, a rail that is fixed so as to extend in the lay-up direction may be provided above the working table 17, and a carrier (which corresponds to the saddle unit 7 in the above-described embodiment) that is movable along the direction in which the rail extends may be provided on the rail. In this case, the head device 11 is supported on (suspended from) the carrier, and the carrier is driven so as to move along the rail, so that the head device 11 is moved in the lay-up direction. In this case, the combination of the fixed rail and the carrier corresponds to the support mechanism according to the present invention.

Thus, in the automatic lay-up machine according to the present invention, the support mechanism is not limited to those in which a carrier (saddle unit 7) that directly supports the head device 11 supports the head device 11 in a rotatable manner, or to those in which a beam member (crossbeam 62, arm, rail) itself that supports the carrier is movable.

(2) In the above-described embodiment, the head device 11 includes the pressing driving mechanism 32 as the structure for moving the lay-up head 31 in the up-down direction, and the pressing driving mechanism 32 includes the ball screw mechanism as the drive converting mechanism 33. However, in the automatic lay-up machine to which the present invention is applied, the structure for moving the lay-up head 31 in the up-down direction is not limited to that in the above-described embodiment, and the following structures may instead be employed.

That is, for example, the drive converting mechanism 33 may instead be, for example, a rack-pinion mechanism. Alternatively, the pressing driving mechanism 32 may include a direct acting actuator (for example, a linear motor) as a drive source instead of the lay-up motor M3 according to the above-described embodiment, and the lay-up head 31 may be directly driven by the actuator without using the drive converting mechanism 33.

In addition, the structure for moving the lay-up head 31 in the up-down direction is not limited to those in which the pressing driving mechanism 32 is provided to move the lay-up head 31 in the up-down direction with respect to the support frame 11a in the head device 11. The lay-up head 31 may instead be fixed in the up-down direction in the head device 11, and the head device 11 itself may be structured so as to be movable in the up-down direction with respect to the support mechanism 12. In this case, the head device 11 itself is moved in the up-down direction to move the lay-up head 31 in the up-down direction.

Figure 8:
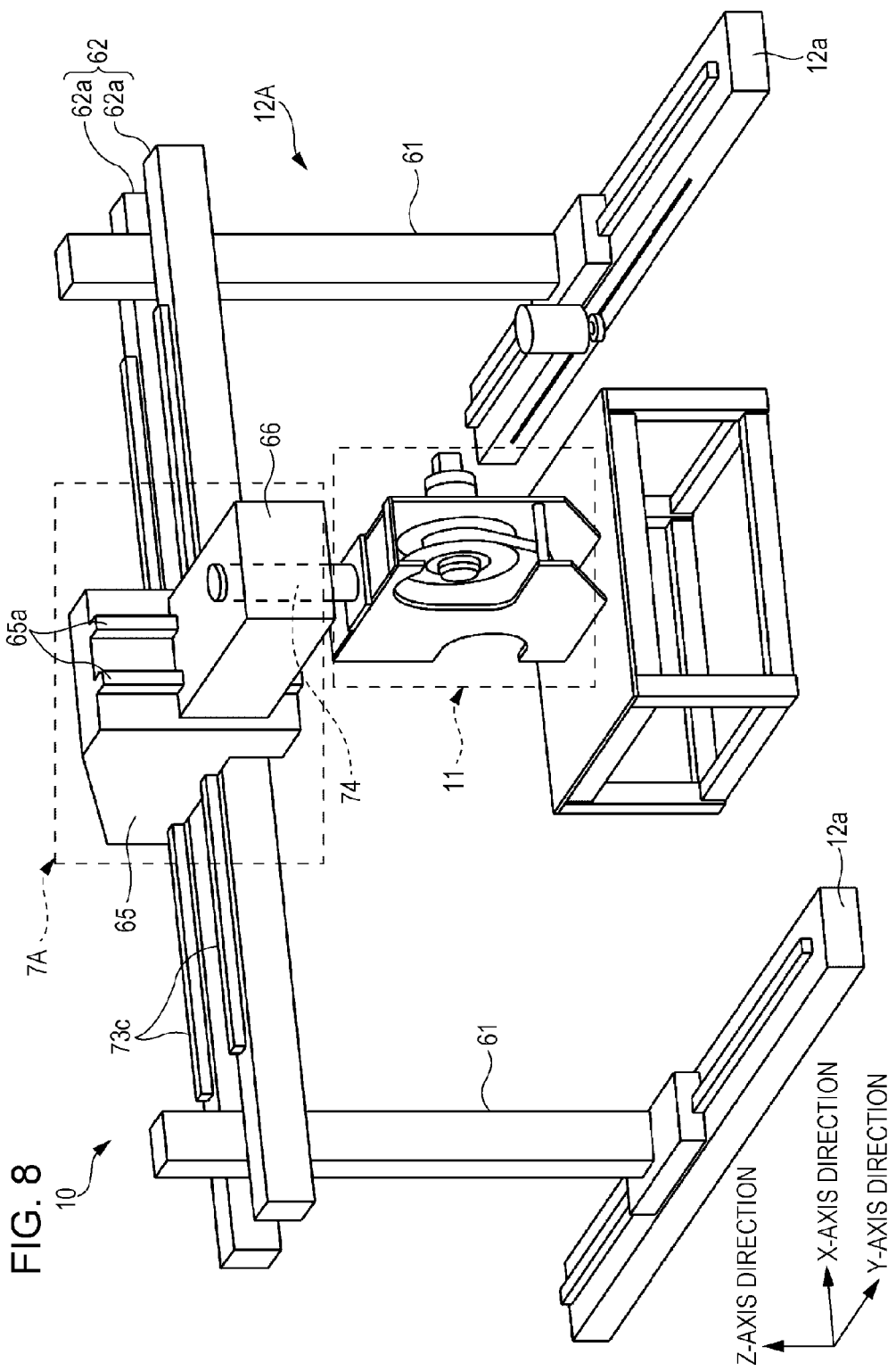
FIG. 8 is a perspective view of another example of an automatic lay-up machine to which the present invention is applied.

More specifically, in this case, as illustrated in FIG. 8, the support mechanism 12 according to the above-described embodiment may be replaced with a support mechanism 12A in which a head device 11 is supported on (suspended from) a saddle unit 7A such that the head device 11 is movable in the left-right direction and up-down direction. In this case, the saddle unit 7A includes a cross saddle 65 that moves along a crossbeam 62 in the left-right direction, and a saddle column 66 that is fitted to a pair of saddle rails 65a and 65a formed on a front surface of the cross saddle 65 so as to extend in the vertical direction (up-down direction). The head device 11 is supported on (suspended from) the saddle column 66 by the shaft member 74 so as to be rotatable around the C-axis. In this case, the lay-up head 31 is fixed in the head device 11. In this structure, the saddle column 66 is moved in the up-down direction by a driving mechanism (not shown), so that the lay-up head 31 is moved in the up-down direction together with the head device 11.

(3) In the above-described embodiment, the tension of the prepreg sheet 15 is changed by rotating the raw-cloth roller 21 in the tension reducing step and the tension returning step. However, in the present invention, the structure for changing the tension of prepreg sheet 15 is not limited to that in the above-described embodiment, and the following structures may instead be employed.

That is, for example, a guide roller that guides the prepreg sheet 15 so as to bend the path of the prepreg sheet 15 may be provided between the raw-cloth roller 21 and the lay-up head 31, and the tension of the prepreg sheet 15 may be changed by changing the position of the guide roller so as to change the length of the path of the prepreg sheet 15 between the raw-cloth roller 21 and the lay-up head 31. In this case, the tension roller 11e according to the above-described embodiment may be configured to function as the above-described guide roller.

Alternatively, the raw-cloth roller 21 may be structured such that the position thereof can be changed in the up-down direction (or the front-back direction), and a driving mechanism for changing the position of the raw-cloth roller 21 may be provided. With this structure, the tension of the prepreg sheet 15 is changed by changing the position of the raw-cloth roller 21. Also in this case, the length of the path of the prepreg sheet 15 between the raw-cloth roller 21 and the lay-up head 31 is changed by changing the position of the raw-cloth roller 21, and the tension of the prepreg sheet 15 is changed accordingly.

(4) In the above-described embodiment, the tension reducing step is performed before the fifth step, so that the pressing force applied between the lay-up head 31 and the prepreg sheet 15 is reduced by reducing the tension of the prepreg sheet 15. Accordingly, in the fifth step, the head device 11 can be moved in the width direction without applying a large force. However, according to the present invention, the tension reducing step and the tension returning step for returning (increasing) the tension of the prepreg sheet 15 that has been reduced in the tension reducing step may be omitted.

More specifically, in the case where the output of the drive source (X-axis motor M5) of the mechanism for moving the head device 11 in the width direction (saddle driving mechanism 73 in the above-described embodiment) is sufficiently high and the retaining force of the prepreg sheet 15 (prepreg 15a) is greater than the force applied to the prepreg sheet 15 in the movement direction of the head device 11 when the head device 11 is moved in the width direction in the fifth step, the end portion of the prepreg sheet 15 does not move together with the lay-up head 31 in the fifth step. Accordingly, the tension reducing step can be omitted, and therefore the tension returning step can also be omitted.

(5) In the above-described embodiment, the head device 11 is moved in the width direction in the fifth step in the state in which the end portion of the prepreg sheet 15 is pressed against the receiving surface 17a as a result of the fourth step, that is, in the state in which only the end portion of the prepreg sheet 15 is laid up on the receiving surface 17a. However, the present invention is not limited to this, and the prepreg 15a may be laid up on the receiving surface 17a by a predetermined length (for example, about 50 mm) before the fifth step is performed.

More specifically, in the above-described embodiment, after the fourth step, the head device 11 may be moved in the lay-up direction so that the prepreg 15a is laid up on the receiving surface 17a by the predetermined length before the tension reducing step is performed. Then, in that state, the tension reducing step and the fifth step are performed.

In the case where the prepreg 15a is laid up on the receiving surface 17a by a predetermined length (or over a predetermined area) before the head device 11 is moved in the width direction in the fifth step, the bonding area between the prepreg 15a and the receiving surface 17a is increased. Accordingly, the above-described retaining force is increased due to the viscosity of the prepreg 15a (prepreg sheet 15) itself. As a result, for example, the force applied to the prepreg sheet 15 by the lay-up head 31 in the fifth step can be reduced, and the pressing force that has been reduced in the tension reducing step can be further reduced. Accordingly, in the fifth step, the head device 11 can be more easily moved and positioned.

(6) In the above-described examples, the automatic lay-up machine 10 includes a single head device 11. However, an automatic lay-up machine to which the present invention is applied is not limited to this, and a plurality of head devices 11 and a plurality of support mechanisms 12 may be arranged in the front-back direction. In such a case, the correction of the lay-up position according to the present invention may be performed for each of the head devices 11.

The present invention is not limited to the above-described embodiment and examples, and various modifications are possible within the scope of the present invention.

What is claimed is:

1. A lay-up-position correcting method for an automatic lay-up machine including
   a head device including
      a sheet supplying unit in which a raw-cloth roller having a long prepreg sheet wound therearound is mounted and that supplies the prepreg sheet from the raw-cloth roller, the prepreg sheet including sheet-shaped prepreg and release paper bonded to a surface of the prepreg,
      a lay-up unit that lays up the prepreg on a receiving surface by pressing the prepreg sheet supplied by the sheet supplying unit against the receiving surface with a lay-up head, and
      a sheet take-up unit that takes up the release paper separated from the prepreg when the prepreg is laid up, and
   a support mechanism that supports the head device and includes a mechanism for moving the head device at least in a lay-up direction of the prepreg and a width direction of the prepreg sheet,
   wherein the lay-up-position correcting method corrects a position of the prepreg sheet in the width direction at a start of a lay-up operation performed by the automatic lay-up machine, and
   wherein the lay-up-position correcting method comprises:
      a first step of establishing a state in which a position of the raw-cloth roller coincides with a lay-up position in the width direction by moving the head device to a starting point of the lay-up position while the head device is in a state in which an end portion of the prepreg sheet fed from the raw-cloth roller is below the lay-up head and in which a predetermined tension is applied to the prepreg sheet;
      a second step of determining a deviation between a position of an edge of the prepreg sheet and the lay-up position in the width direction;
      a third step of establishing a state in which the position of the edge of the prepreg sheet coincides with the lay-up position in the width direction by moving the head device by a movement amount corresponding to the deviation in a movement direction along the width direction for cancelling the deviation;
      a fourth step of establishing a state in which the end portion of the prepreg sheet is pressed against the receiving surface at the starting point of the lay-up position by moving the head device or the lay-up head downward; and
      a fifth step of reestablishing the state in which the position of the raw-cloth roller coincides with the lay-up position in the width direction by moving the head device in a direction along the width direction opposite to the movement direction in the third step by an amount equal to the movement amount in the third step.

2. The lay-up-position correcting method according to claim 1, further comprising:
      a tension reducing step of reducing a tension of the prepreg sheet, the tension reducing step being performed between the fourth step and the fifth step; and a tension returning step of reestablishing the state in which the predetermined tension is applied to the prepreg sheet, the tension returning step being performed after the fifth step.

3. The lay-up-position correcting method according to claim 2, wherein the tension reducing step is a step of rotating the raw-cloth roller in a direction for feeding the prepreg sheet, and the tension returning step is a step of rotating the raw-cloth roller in a direction for rewinding the prepreg sheet.

* * * * *